United States Patent
Jin et al.

(10) Patent No.: US 11,829,471 B2
(45) Date of Patent: *Nov. 28, 2023

(54) ANOMALY EVENT DETECTION

(71) Applicant: Splunk Inc., San Francisco, CA (US)

(72) Inventors: Zhuxuan Jin, Sunnyvale, CA (US); George Apostolopoulos, San Jose, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,566

(22) Filed: Jan. 18, 2023

(65) Prior Publication Data

US 2023/0153430 A1 May 18, 2023

Related U.S. Application Data

(63) Continuation of application No. 17/332,804, filed on May 27, 2021, now Pat. No. 11,586,729, which is a
(Continued)

(51) Int. Cl.
*G06F 21/55* (2013.01)
*G06F 16/245* (2019.01)
(Continued)

(52) U.S. Cl.
CPC .......... *G06F 21/554* (2013.01); *G06F 16/245* (2019.01); *G06F 21/552* (2013.01);
(Continued)

(58) Field of Classification Search
CPC .... G06F 21/554; G06F 16/245; G06F 21/552; G06F 21/56; G06F 2221/034; H04L 63/1416
See application file for complete search history.

(56) References Cited

U.S. PATENT DOCUMENTS

| | | |
|---|---|---|
| 6,125,392 A | 9/2000 | Labatte et al. |
| 10,756,983 B2 | 8/2020 | Ratkovic et al. |
| | (Continued) | |

FOREIGN PATENT DOCUMENTS

WO   WO 2022/239030 A1 * 11/2022 ............... G06N 3/04

OTHER PUBLICATIONS

Kuchar, J. et al., "Spotlighting Anomalies using Frequent Patterns"; KDD 2017: Workshop on Anomaly Detection in Finance; Proceedings of Machine Learning Research, vol. 71; pp. 33-42; Aug. 14, 2017 (10 pages).

(Continued)

*Primary Examiner* — Christopher A Revak
(74) *Attorney, Agent, or Firm* — Ferguson Braswell Fraser Kubasta PC

(57) ABSTRACT

A method is disclosed that includes receiving, at a computing device, an event log including events derived from machine data, and determining a score by comparing an event from the event log with frequent patterns of features. Determining the score includes determining a length of a frequent pattern within the event in the event log and a count of occurrences of the frequent pattern within the events, determining a contribution of the frequent pattern based on the length and the count, determining a penalty for an unmatched feature of the first event based on a cardinality of the events, and averaging the contribution and the penalty to obtain the score. The method further includes issuing an alert identifying the first event as an anomaly using the first score and an anomaly score threshold.

20 Claims, 18 Drawing Sheets

Related U.S. Application Data continuation of application No. 16/399,734, filed on Apr. 30, 2019, now Pat. No. 11,055,405.

(51) Int. Cl.
*G06F 21/56* (2013.01)
*H04L 9/40* (2022.01)

(52) U.S. Cl.
CPC .......... *G06F 21/56* (2013.01); *H04L 63/1416* (2013.01); *G06F 2221/034* (2013.01)

(56) References Cited

U.S. PATENT DOCUMENTS

| | | | |
|---|---|---|---|
| 10,904,277 | B1 | 1/2021 | Sharifi Mehr |
| 11,055,405 | B1* | 7/2021 | Jin .......................... G06F 21/56 |
| 11,586,729 | B2* | 2/2023 | Jin ...................... H04L 63/1416 |
| 2011/0206284 | A1 | 8/2011 | Madirakshi et al. |
| 2016/0205117 | A1* | 7/2016 | Laifenfeld .......... H04L 63/1416 726/23 |
| 2018/0004948 | A1 | 1/2018 | Martin et al. |
| 2018/0365419 | A1* | 12/2018 | Monastyrsky .......... G06F 21/52 |
| 2019/0044963 | A1 | 2/2019 | Rajasekharan et al. |
| 2019/0207969 | A1 | 7/2019 | Brown |
| 2019/0294781 | A1* | 9/2019 | Keren ................. G06F 11/3409 |
| 2021/0021610 | A1 | 1/2021 | Ahire et al. |

OTHER PUBLICATIONS

Agrawal, R. et al., "Mining Association Rules between Sets of Items in Large Databases"; SIGMOD '93: Proceeding of the 1993 ACM SIGMOD international conference on Management of Data; pp. 207-216; May 25-28, 1993 (10 pages).

Agrawal, R. et al., "Fast Algorithms for Mining Association Rules"; VLDB '94: Proceedings of the 20th International Conference on Very Large Data Bases; pp. 487-499; Sep. 12-15, 1994 (13 pages).

Splunk Inc., "Frequent Pattern Based Anomaly Event Detection", U.S. Appl. No. 17/332,804, including its prosecution history.

Splunk Inc., "Anomaly Event Detection Using Frequent Patterns", U.S. Appl. No. 16/399,734, including its prosecution history.

* cited by examiner

ANOMALY EVENT DETECTION

CROSS REFERENCE TO RELATED APPLICATIONS

This application is a continuation of, and thereby claims benefit under 35 U.S.C. § 120 to, U.S. patent application Ser. No. 17/332,804, entitled "Frequent Pattern Based Anomaly Event Detection," and filed on May 27, 2021. U.S. patent application Ser. No. 17/332,804 is a continuation of, and thereby claims benefit under 35 U. S.C. § 120 to, U.S. patent application Ser. No. 16/399,734, entitled "Anomaly Event Detection Using Frequent Patterns," and filed on Apr. 30, 2019. U.S. patent application Ser. Nos. 17/332,804 and 16/399,734 are incorporated herein by reference in their entirety.

BACKGROUND

Network systems are a set of interconnected devices that together provide computing functionality. For example, networks may include storage devices, end-user terminals, application servers, routers, and other devices. Security and proper resource management are concerns for networks of all sizes. Accordingly, one or more components associated with the network should quickly and efficiently detect an anomalous event because such an event may correspond to a security threat to the network (e.g., unauthorized access, attack, etc.) and/or an inefficient use of network resources (e.g., excessive bandwidth consumption).

DETAILED DESCRIPTION

Figure 1:
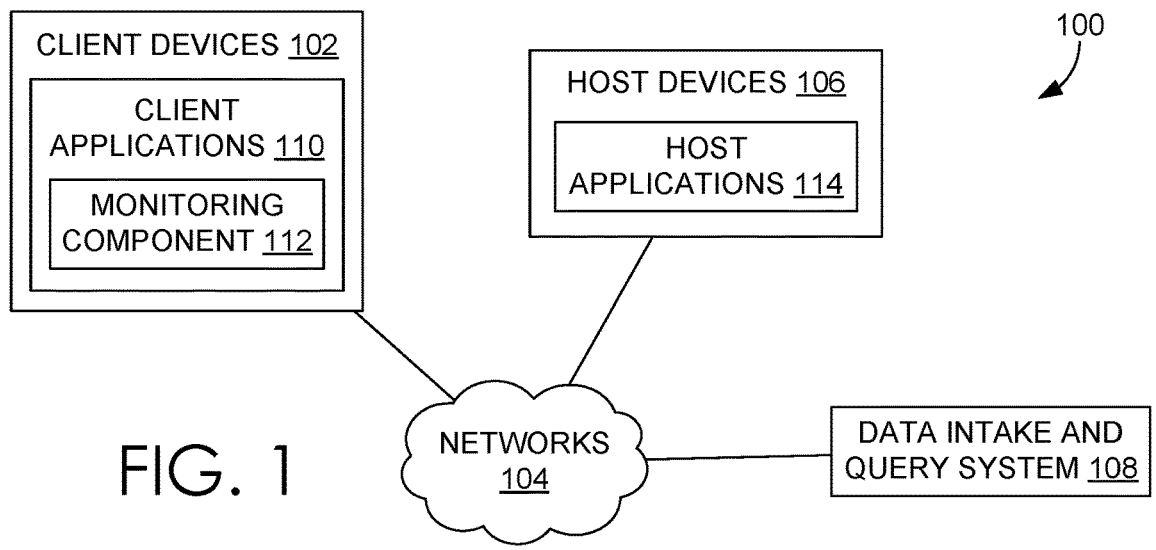
FIG. 1 illustrates a networked computer environment in which an embodiment may be implemented.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments, the various disclosed embodiments may be combined in virtually any manner. All combinations are contemplated herein.

In general, embodiments are directed to an efficient technique for detecting anomalous events. In one or more embodiments, multiple scores are calculated for an event by comparing the features in the event with multiple frequent patterns spanning one or more granularity levels. An aggregate score for the event is calculated for the event based the multiple scores, and the aggregate score is used to determine whether the event is an anomaly (e.g., a potential security threat to the network, a fault or failure of one or more hardware and/or software components of the computing environment, inefficient use of resources). The frequent patterns are generated by executing one or more frequent itemset mining algorithms on historic events that have been classified as normal (i.e., not anomalies).

Embodiments are described herein according to the following outline:

1.0. General Overview
2.0. Operating Environment
  2.1. Host Devices
  2.2. Client Devices
  2.3. Client Device Applications
  2.4. Data Server System
  2.5. Data Ingestion
    2.5.1. Input
    2.5.2. Parsing
    2.5.3. Indexing
  2.6. Query Processing
  2.7. Field Extraction
  2.8. Data Modelling
  2.9. Acceleration Techniques
    2.9.1. Aggregation Technique
    2.9.2. Keyword Index
    2.9.3. High Performance Analytics Store
    2.9.4. Accelerating Report Generation
  2.10. Security Features
  2.11. Data Center Monitoring
  2.12. Cloud-Based System Overview
  2.13. Searching Externally Archived Data
    2.13.1. ERP Process Features
  2.14. IT Service Monitoring
3.0. Anomaly Event Detection
4.0. Hardware
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
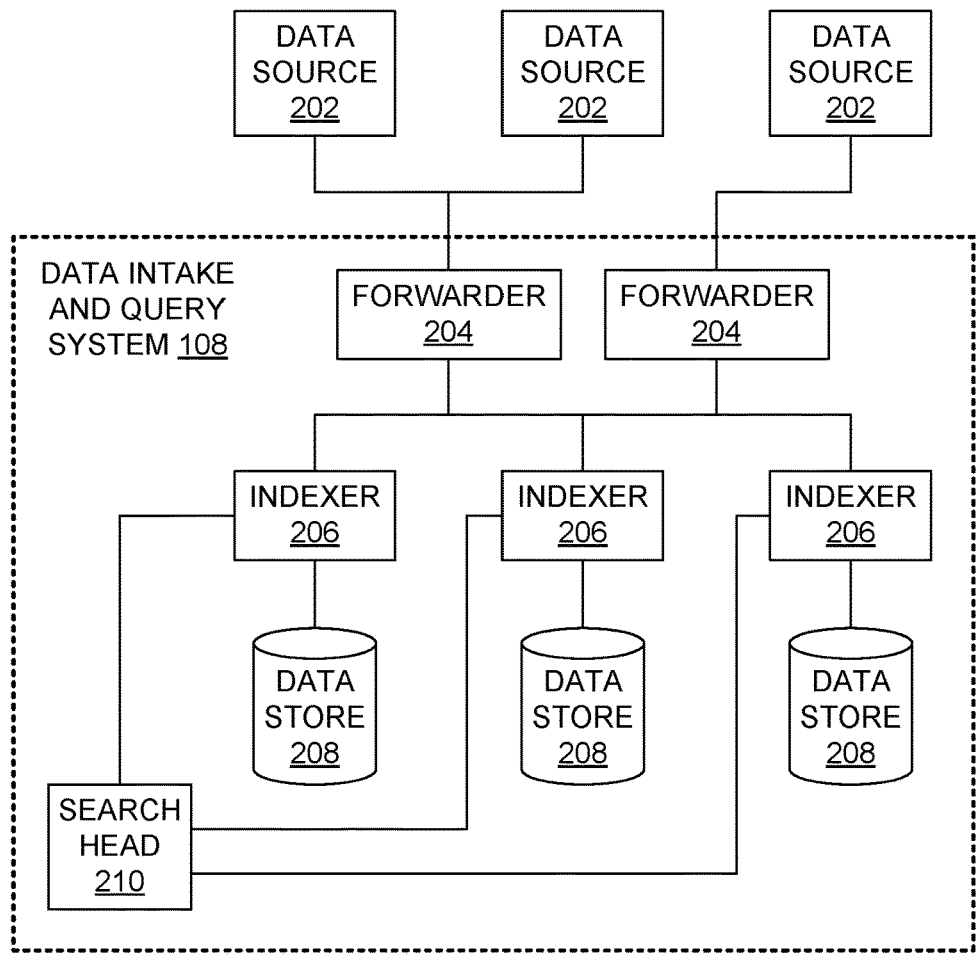
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
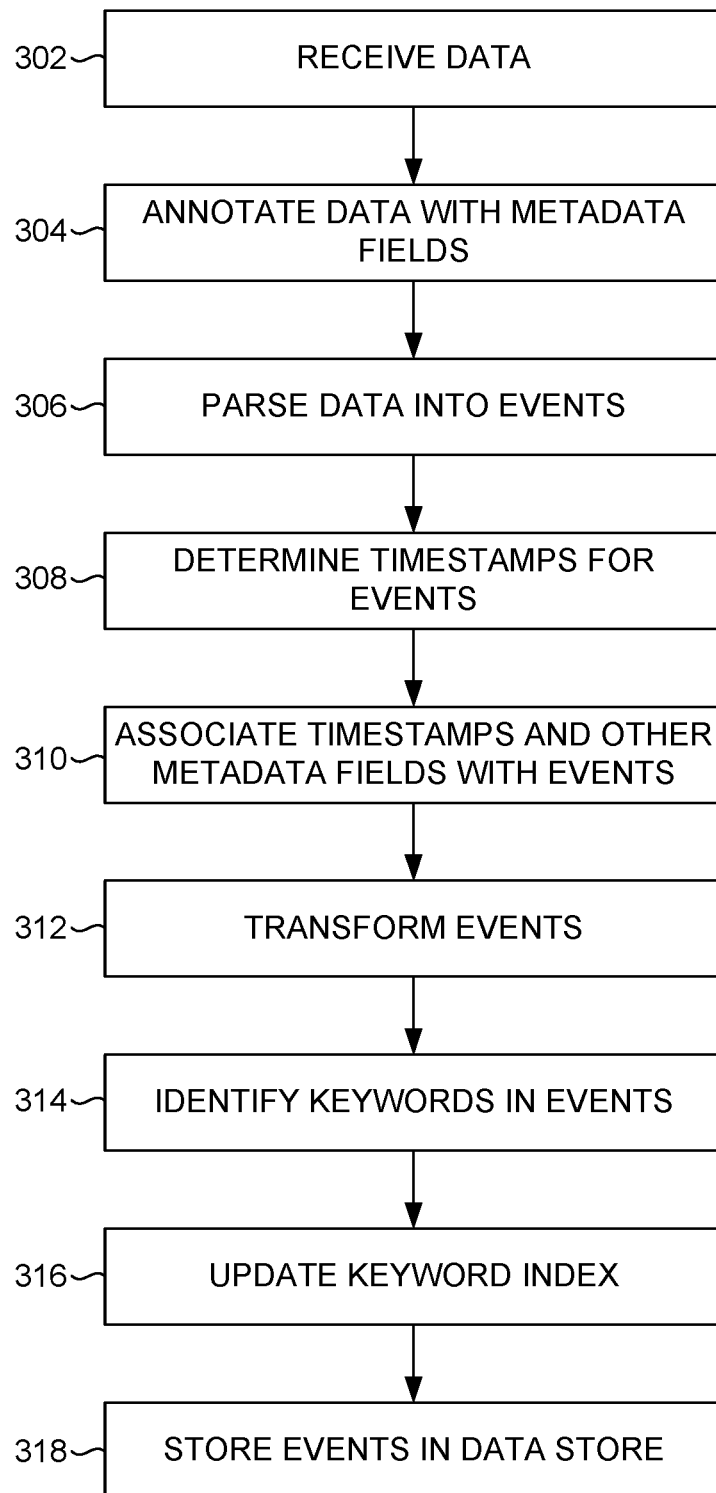
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "Site-Based Search Affinity", filed on 30 Apr. 2014, and in U.S. patent application Ser. No. 14/266,817, entitled "Multi-Site Clustering", also filed on 30 Apr. 2014, each of which is hereby incorporated by reference in its entirety for all purposes.

2.6. Query Processing

Figure 4:
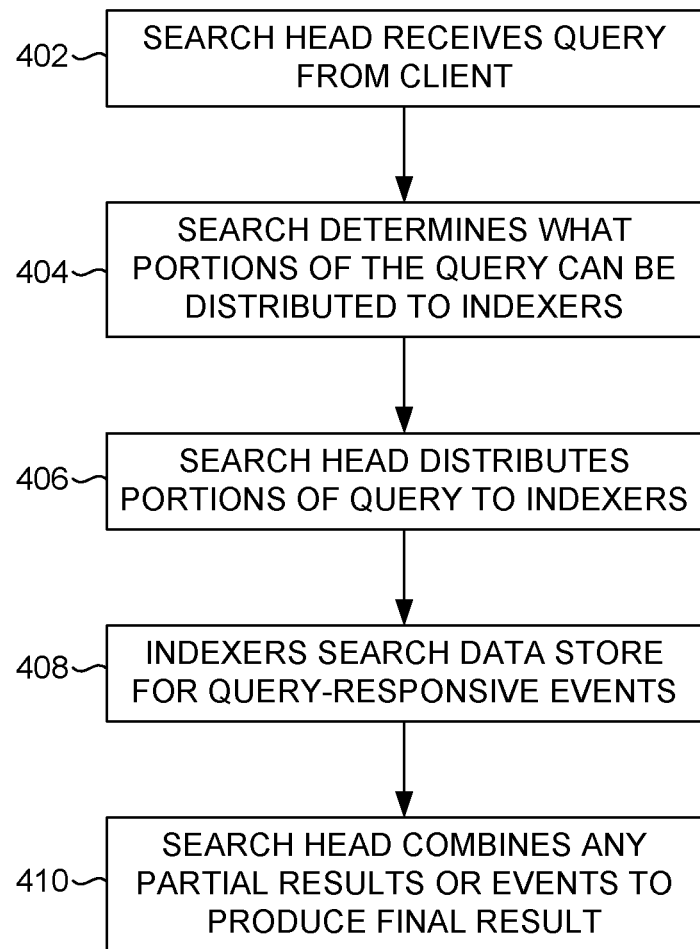
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
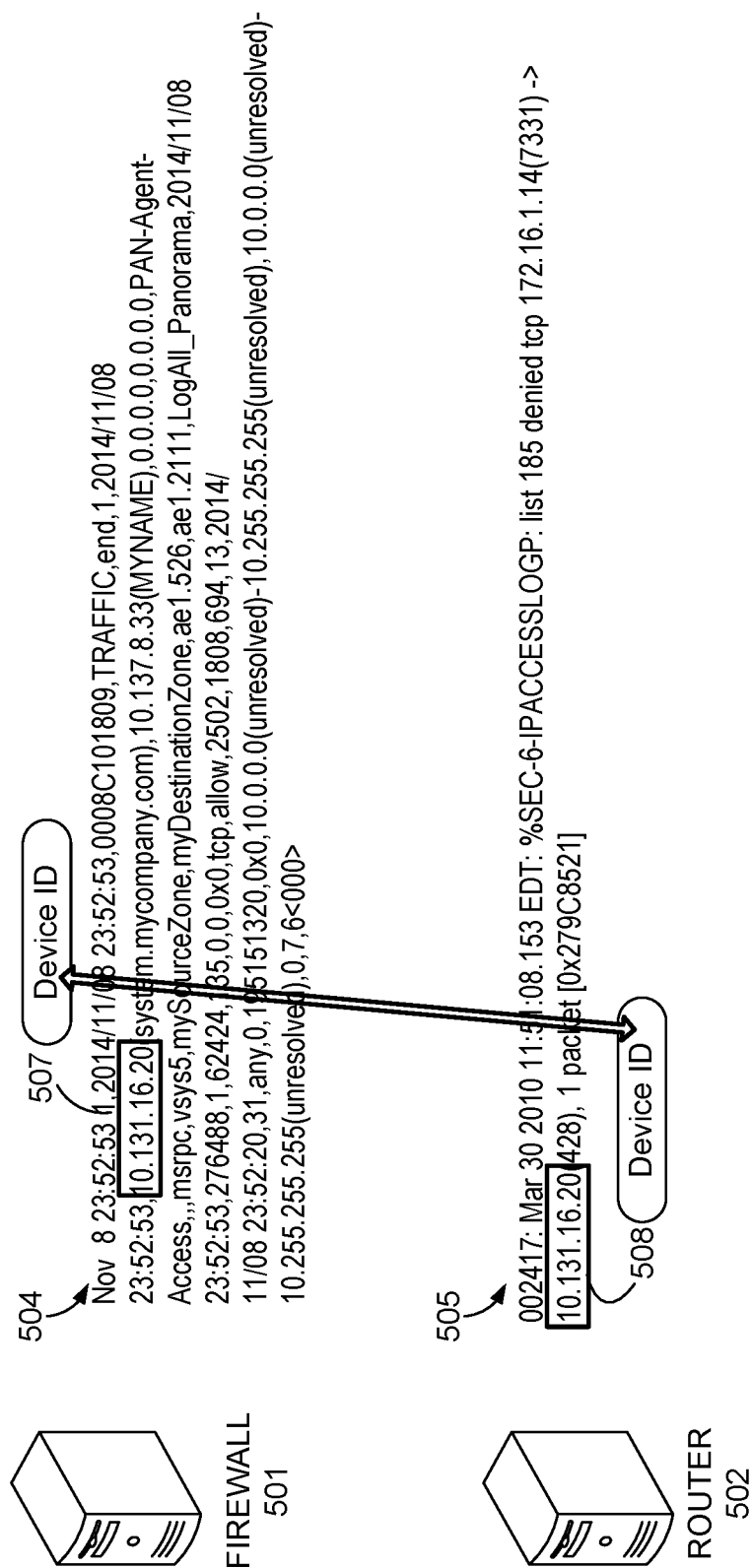
FIG. 5 illustrates a scenario where a common customer ID is found among log data received from three disparate sources in accordance with the disclosed embodiments.

FIG. 5 illustrates an example of raw machine data received from disparate data sources. In this example, a firewall 501 running on the network processes traffic from outside the company and allows or denies traffic. The firewall 501 creates a log entry 504 for the traffic processed. A router 502 running on the network routes traffic through the network. The router 502 creates a log entry 505 for the traffic processed. The systems 501 and 502 are disparate systems that do not have a common logging format. The log data 504 and 505 are sent to the SPLUNK® ENTERPRISE system in different formats.

Using the log data received at one or more indexers 206 from the systems, the vendor can uniquely obtain an insight into device behavior. The search head 210 allows the vendor's administrator to search the log data from the systems that one or more indexers 206 are responsible for searching, thereby obtaining correlated information, such as the device ID. The device ID field value exists in the data gathered from the systems, but the device ID field value may be located in different areas of the data given differences in the architecture of the systems—there is a semantic relationship between the device ID field values generated by the systems.

The search head 210 requests event data from the one or more indexers 206 to gather relevant event data from the systems. It then applies extraction rules to the event data in order to extract field values that it can correlate. The search head may apply a different extraction rule to each set of events from each system when the event data format differs among systems.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 March, 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No.

14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

2.9. Acceleration Technique

The above-described system provides significant flexibility by enabling analysis of massive quantities of minimally processed data "on the fly" at search time instead of storing pre-specified portions of the data in a database at ingestion time. This flexibility enables valuable insights, data correlation, and the performance of subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.9.1. Aggregation Technique

Figure 6:
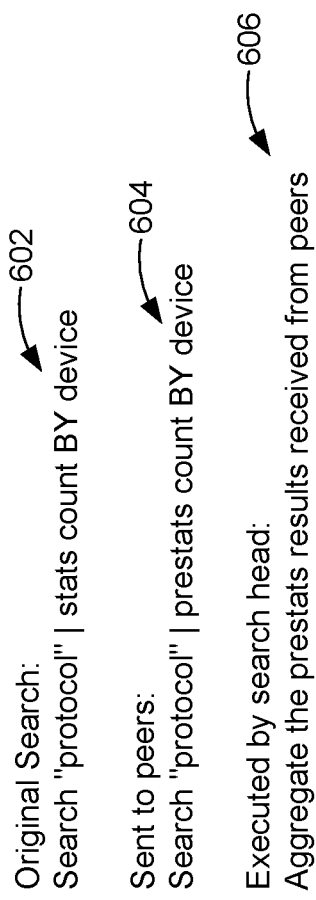
FIG. 6 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 6 illustrates how a search query 602 received from a client at a search head 210 can split into two phases, including: (1) subtasks 604 (e.g., data retrieval or simple filtering) that may be performed in parallel by indexers 206 for execution, and (2) a search results aggregation operation 606 to be executed by the search head when the results are ultimately collected from the indexers.

During operation, upon receiving search query 602, a search head 210 determines that a portion of the operations involved with the search query may be performed locally by the search head. The search head modifies search query 602 by substituting "stats" (create aggregate statistics over results sets received from the indexers at the search head) with "prestats" (create statistics by the indexer from local results set) to produce search query 604, and then distributes search query 604 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 606 to form a single search result set. By executing the query in this manner, the system effectively distributes the computational operations across the indexers while minimizing data transfers.

2.9.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.9.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "Distributed High Performance Analytics Store", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.9.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criterion, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "Compressed Journaling In Event Tracking Files For Metadata Recovery And Replication", issued on 19 Nov. 2013, U.S. Pat. No. 8,412,696, entitled "Real Time Searching And Reporting", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.10. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

2.11. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "Correlation For User-Selected Time Ranges Of Values For Performance Metrics Of Components In An Information-Technology Environment With Log Data From That Information-Technology Environment", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

2.12. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 7:
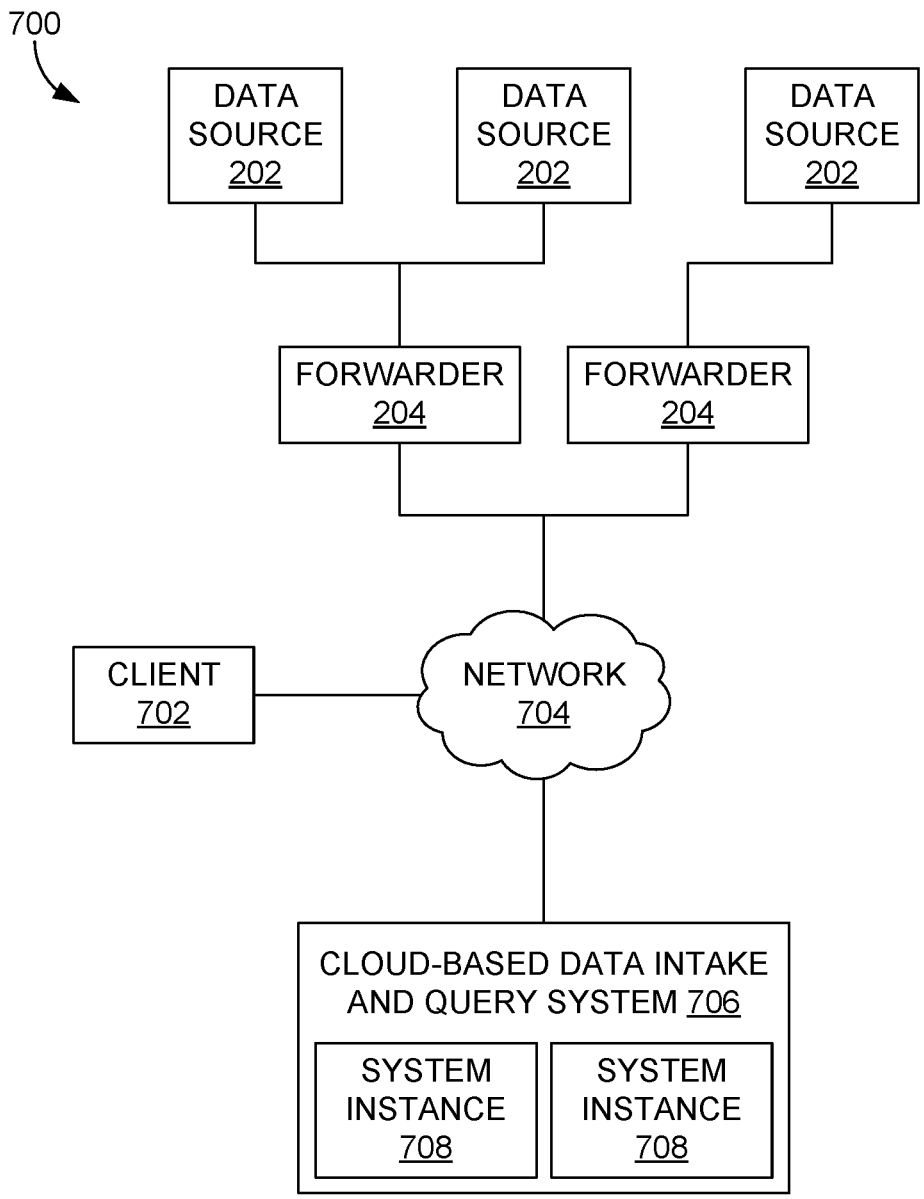
FIG. 7 illustrates a block diagram of an example cloud-based data intake and query system in which an embodiment may be implemented.

FIG. 7 illustrates a block diagram of an example cloud-based data intake and query system. Similar to the system of FIG. 2, the networked computer system 700 includes input data sources 202 and forwarders 204. These input data sources and forwarders may be in a subscriber's private computing environment. Alternatively, they might be directly managed by the service provider as part of the cloud service. In the example system 700, one or more forwarders 204 and client devices 702 are coupled to a cloud-based data intake and query system 706 via one or more networks 704.

Network 704 broadly represents one or more LANs, WANs, cellular networks, intranetworks, internetworks, etc., using any of wired, wireless, terrestrial microwave, satellite links, etc., and may include the public Internet, and is used by client devices 702 and forwarders 204 to access the system 706. Similar to the system of 108, each of the forwarders 204 may be configured to receive data from an input source and to forward the data to other components of the system 706 for further processing.

In an embodiment, a cloud-based data intake and query system 706 may comprise a plurality of system instances 708. In general, each system instance 708 may include one or more computing resources managed by a provider of the cloud-based system 706 made available to a particular subscriber. The computing resources comprising a system instance 708 may, for example, include one or more servers or other devices configured to implement one or more forwarders, indexers, search heads, and other components of a data intake and query system, similar to system 108. As indicated above, a subscriber may use a web browser or other application of a client device 702 to access a web portal or other interface that enables the subscriber to configure an instance 708.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 708) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.13. Searching Externally Archived Data

Figure 8:
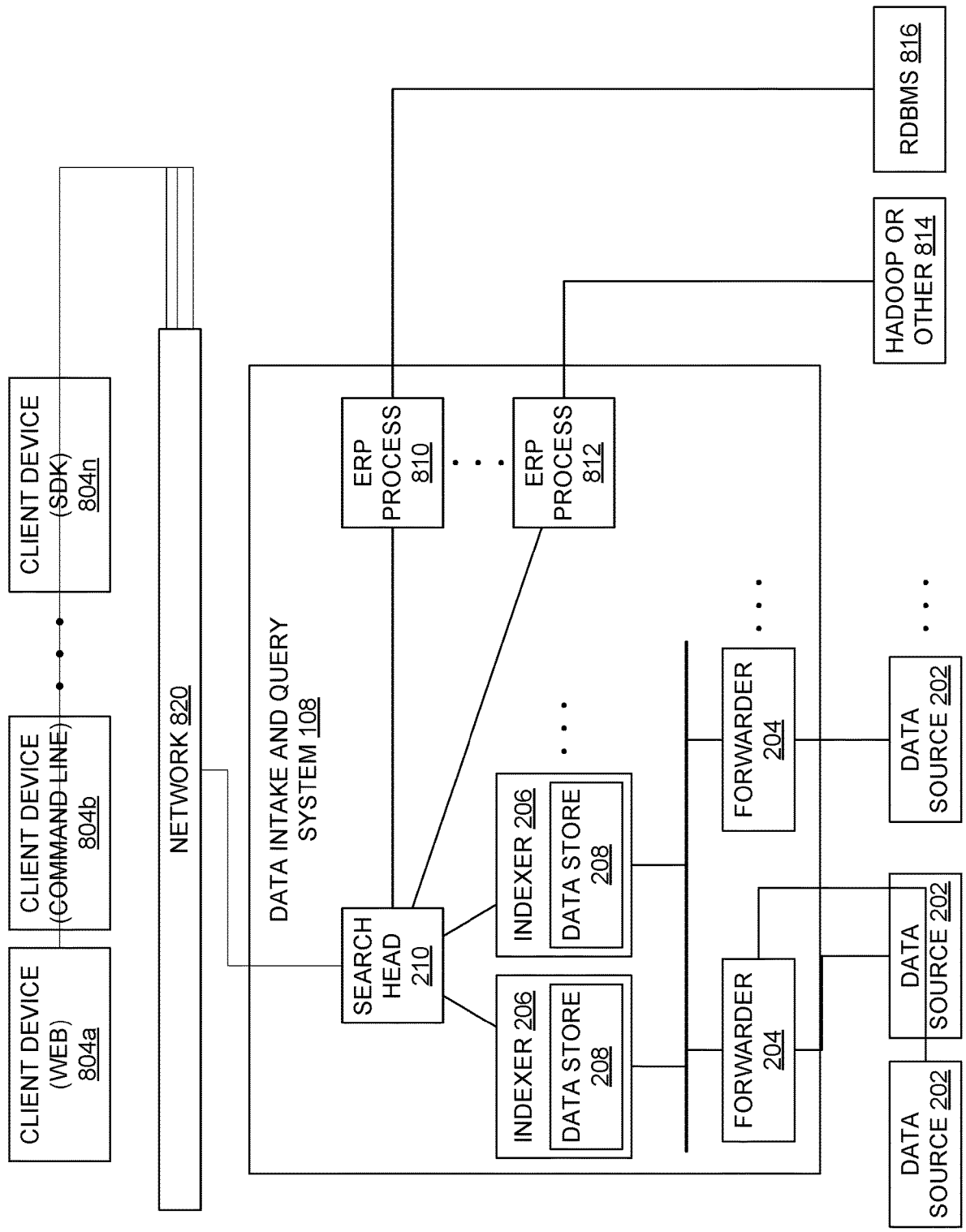
FIG. 8 illustrates a block diagram of an example data intake and query system that performs searches across external data systems in accordance with the disclosed embodiments.

FIG. 8 shows a block diagram of an example of a data intake and query system 108 that provides transparent search facilities for data systems that are external to the data intake and query system. Such facilities are available in the HUNK® system provided by Splunk Inc. of San Francisco, California. HUNK® represents an analytics platform that enables business and IT teams to rapidly explore, analyze, and visualize data in Hadoop and NoSQL data stores.

The search head 210 of the data intake and query system receives search requests from one or more client devices 804 over network connections 820. As discussed above, the data intake and query system 108 may reside in an enterprise location, in the cloud, etc. FIG. 8 illustrates that multiple client devices 804a, 804b, . . . , 804n may communicate with the data intake and query system 108. The client devices 804 may communicate with the data intake and query system using a variety of connections. For example, one client device in FIG. 8 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 804 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 810. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 810, 812. FIG. 8 shows two ERP processes 810, 812 that connect to respective remote (external) virtual indices, which are indicated as a Hadoop or another system 814 (e.g., Amazon S3, Amazon EMR, other Hadoop Compatible File Systems (HCFS), etc.) and a relational database management system (RDBMS) 816. Other virtual indices may include other file organizations and protocols, such as Structured Query Language (SQL) and the like. The ellipses between the ERP processes 810, 812 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 810, 812 receive a search request from the search head 210. The search head may optimize the received search request for execution at the respective external virtual index. Alternatively, the ERP process may receive a search request as a result of analysis performed by the search head or by a different system process. The ERP processes 810, 812 can communicate with the search head 210 via conventional input/output routines (e.g., standard in/standard out, etc.). In this way, the ERP process receives the search request from a client device such that the search request may be efficiently executed at the corresponding external virtual index.

The ERP processes 810, 812 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 810, 812 generate appropriate search requests in the protocol and syntax of the respective virtual indices 814, 816, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 804 may communicate with the data intake and query system 108 through a network interface 820, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "External Result Provided Process For RetriEving Data Stored Using A Different Configuration Or Protocol", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.13.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One example query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example.

(The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, California.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0. Anomaly Event Detection

As described above, embodiments are directed to an efficient technique for detecting anomalous events, such as events received by the data intake and query system. For an event, multiple scores are calculated by comparing the features in the event with multiple frequent patterns spanning one or more granularity levels. The multiple scores are combined to calculate an aggregate score, and the aggregate score is used to determine whether the event is an anomaly (e.g., a potential security threat to the network, a fault or failure of one or more hardware and/or software components of the computing environment, inefficient use of resources). The frequent patterns are generated by executing one or more frequent itemset mining algorithms on historic events that have been classified as normal (i.e., not classified as anomalies).

Figure 9:
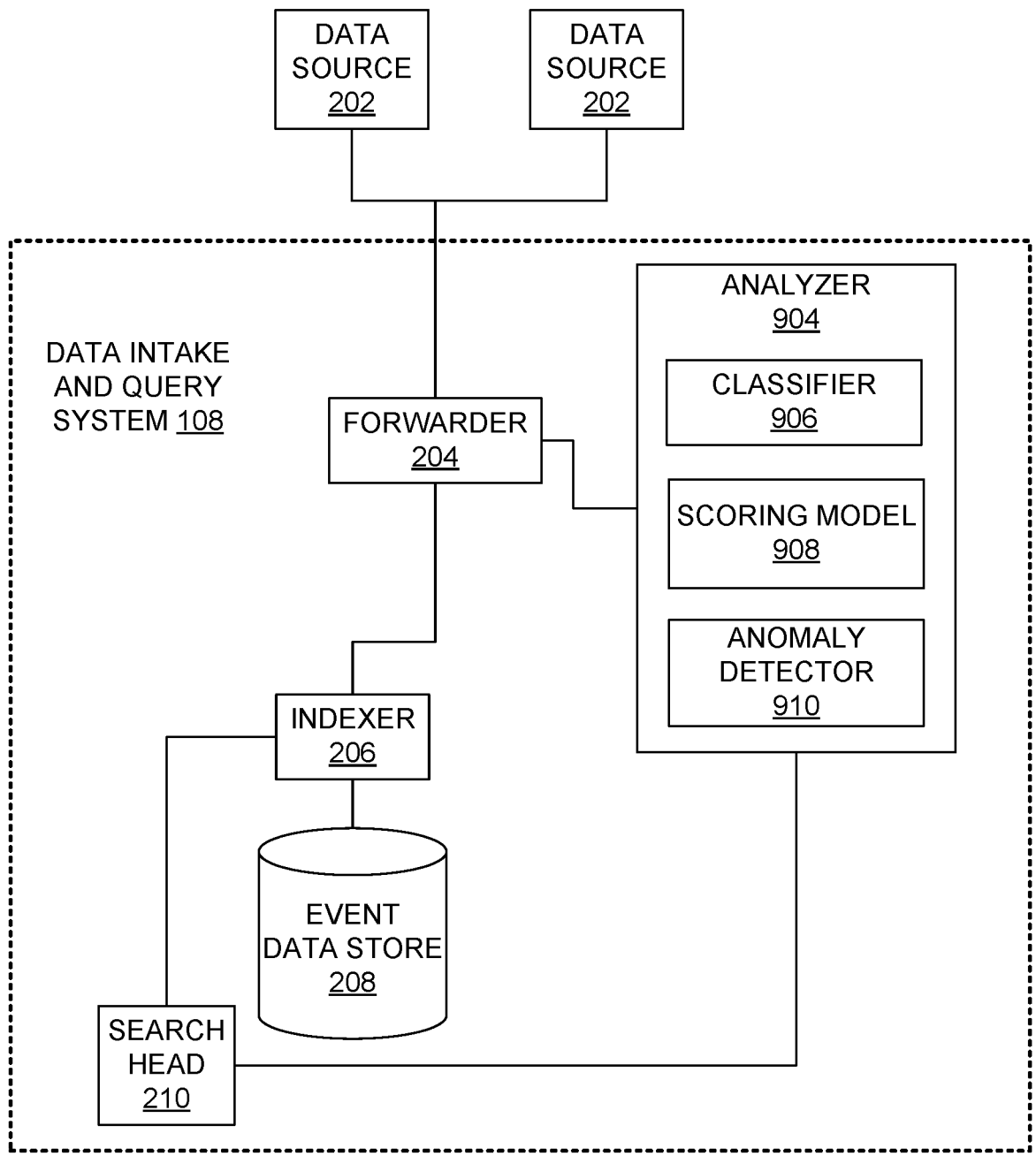
FIG. 9 illustrates a block diagram of an example data intake and query system in which an embodiment may be implemented.

FIG. 9 illustrates a block diagram of an example data intake and query system in which an embodiment may be implemented. In FIG. 9, the data sources 202, data intake and query system 108, forwarder 204, indexer 206, and search head 210 may be the same or similar to the like named components shown in FIG. 2. The event data store 208 of FIG. 9 may be the same or similar to the data store 208 shown in FIG. 2. Further, although fewer instances of the components are shown, any number of instances may exist. For example, the data sources may be in the hundreds or thousands. Similarly, the number of forwarders, indexers, and data stores may similarly scale.

As shown in FIG. 9, the data intake and query system further includes an analyzer 904. The data intake and query system 108 may correspond to a server group having multiple servers. Each server may, for example, correspond to hardware. Thus, the forwarder 204, indexer 206, data store 208, search head 210, and analyzer 904 may each be a server.

Continuing with FIG. 9, the analyzer 904 is communicatively connected to the event data store 208. The analyzer 904 may be hardware, software, or firmware, or any combination thereof that includes functionality to process event data to generate conclusions (e.g., anomalies, threat indicators, threats, or any combination thereof). The analyzer 904 may operate in real-time. "Real-time" computing, or "reactive computing", describes computer systems subject to a processing responsiveness restriction (e.g., in a service level objective (SLO) in a service level agreement (SLA)). In real-time processing, conclusions are reached substantially immediately following the receipt of input data such that the conclusions can be used to respond to the observed environment. The analyzer 904 continuously receives new events from the indexer 206 and reacts to each new incoming event by processing the event through a scoring model 908 and an anomaly detector 910. The analyzer 904 may further analyze historical data. In such a scenario, the analyzer 904 may use event data obtained from queries submitted to the search head 210.

The analyzer 904 includes a classifier 906, scoring model 908, and an anomaly detector 910. The classifier 906 includes functionality to classify events into activity types. In one or more embodiments, the classifier 906 is configured to binary encode each event and then cluster the events into activity types by executing one or more clustering algorithms on the binary encodings. The binary encoding for an event may be based on the types of features found in the event and the types of features not present (i.e., missing) in the event. Additional details regarding the classifier 906 and the classifier's operations are described below with reference to FIGS. 10, 11, and 18.

A scoring model 908 is hardware, software, firmware, or any combination thereof that includes functionality to generate an aggregate score for an event. For example, the aggregate score may be generated based on multiple scores for the event, and each of the multiple scores may be based on one or more frequent patterns. Different scores of the multiple scores for an event may correspond to different sets of frequent patterns associated with different levels of granularity. The scoring model 908 may also include functionality to generate the frequent patterns by mining historic events for frequent features. Additional details regarding the scoring model 908 and the scoring model's operations are described below with reference to FIGS. 12, 13, 16, and 19.

An anomaly detector 910 is hardware, software, firmware, or any combination thereof that includes functionality to detect anomalies. In this description, an "anomaly" may be described as an event including one or more features that are uncommon or unexpected for the activity type associated with the event. In security, an anomaly might or might not be indicative of a threat. An anomaly represents an action of possible concern, which may be actionable or warrant further investigation. An anomaly is an observable or detectable fact, or data representing such fact.

Continuing with the anomaly detector 910, the anomaly detector 910 includes functionality to process events in real time and/or based on historical events. In one or more embodiments, the anomaly detector 910 compares the aggregate scores of events with an anomaly score threshold and issues alerts identifying events as anomalies. Further, the anomaly detector 910 may reclassify events from anomaly to normal (i.e., not an anomaly) when events with identical features appear frequently. Further, the anomaly detector 910 may increase the aggregate score for an event (indicating the event is of higher concern) when one or more conditions are satisfied (e.g., this event contains features that occurred suddenly in a high volume among certain users). Further, the anomaly detector 910 may reduce the aggregate score for an event (indicating less concern, but still classified as anomaly) when one or more conditions satisfied (e.g., this event contains features that occurred with low frequency among certain users in the past a few days). Further still, the anomaly detector 910 may issue custom reports reporting events that occur with a specific count within a time window. Additional details regarding the anomaly detector 910 and the anomaly detector's operations are described below with reference to FIGS. 14 and 17.

Figure 10:
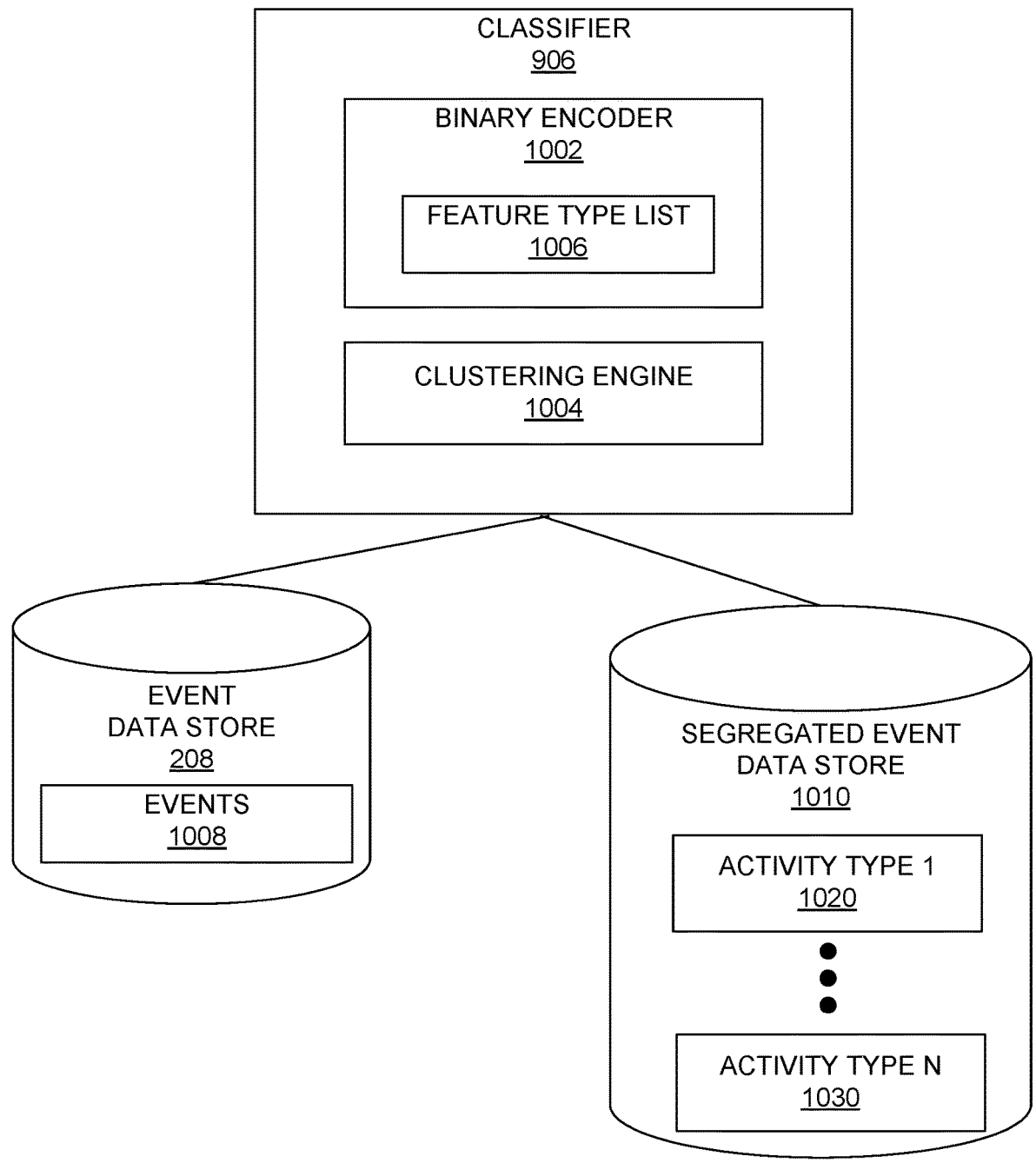
FIG. 10 illustrates a block diagram of an example classifier and data store in which an embodiment may be implemented.

FIG. 10 shows a diagram of a classifier 906, event data store 208, and a segregated event data store 1010. The classifier 906 and event data store 208 may correspond to like named components of FIG. 9. The various components of FIG. 10 may be part of the data intake and query system as described above or a distinct system. As shown in FIG. 10, the event data store 208 includes functionality to store events 1008. As discussed above, an event includes a portion of machine-generated data and is associated with a specific point in time (timestamp). Each event in the event data store 208 is a recordation of activity of one or more computing devices. The events 1008 may include network traffic events including packets through one or more firewalls, packets routed by one or more routers, etc. For example, each event may correspond to a single packet processed by the firewall on the network.

In one or more embodiments, an event has one or more features. A feature may be a single value of a single data item in the event, a collection of values of a data item in an event, or derived or otherwise determined from a collection of values. Each feature may be of a particular feature type. The type of feature defines the information that the feature represents.

Although not shown, additional data sources may be used by the classifier 906. For example, the additional data may include events from other logs (e.g., endpoint logs, operating system logs, and various types of application logs), databases, among other examples. The endpoint logs may provide information about processes running in a machine, and the operating system of a device. The operating system logs may provide information about the activity in the device. Application logs, such as database logs may be used to provide information about the applications that are executing on each device.

The classifier 906 includes a binary encoder 1002 with a feature type list 1006. The feature type list 1006 stores many or all of the types of features that may be present in the events 1008. Example feature types may include destination device, source device, port number, protocol used, application name, application type, etc. The binary encoder 1002 is configured to generate a binary encoding for each of the events 1008. A binary encoding many have multiple entries and each entry can correspond to one of the feature types in the feature type list 1006. If an entry in a binary encoding is populated with a "1", then the corresponding event has a feature belonging to the feature type associated with the entry. If an entry in a binary encoding is populated with a "0", then the corresponding event does not have a feature (i.e., is missing a feature) belonging to the feature type associated with the entry. Alternatively, "0" may correspond to the existence of the feature and "1" may correspond to lack of the feature without departing from the scope of the disclosure. Example binary encodings are shown in FIG. 11.

In one or more embodiments, the clustering engine 1004 is configured to group or cluster the events 1008 into activity types. In one or more embodiments, an activity type is a task performed by a computing device or computer component. In one or more embodiments, an activity type is a task performed by the network or involving the network. For example, activity types may include logins, authentications, resource accessing, etc. Events grouped or clustered to the same activity type have similar feature types. In contrast, different events belonging to different activity types have different feature types. In one or more embodiments, the clustering engine 1004 executes a clustering algorithm not on the events themselves, but rather on the binary encodings to group or cluster the binary encodings into activity types. Once it is determined which binary encodings belong to which activity types, the clustering of the corresponding events is known. Example clustering algorithms include k-means clustering, mean-shift clustering, density-based spatial clustering of applications with noise (DB SCAN), and power iteration clustering on the Jaccard distance.

As further shown in FIG. 10, the segregated event data store 1010 is software and/or hardware storage structure that includes functionality to store the events 1008 grouped or clustered by activity types (i.e., activity type 1 1020, activity type N 1030) following operation of the clustering engine 1004 or another process that clusters or groups the events by activity types (i.e., activity type 1 1020, activity type N 1030). In one or more embodiments, the segregated event data store 1010 and the event data store 208 are part of the same physical storage device. In one or more embodiments, once the activity type for an event has been determined, the event (or a copy of the event) is moved from the event data store 208 to the segregated event data store 1010.

Figure 11:
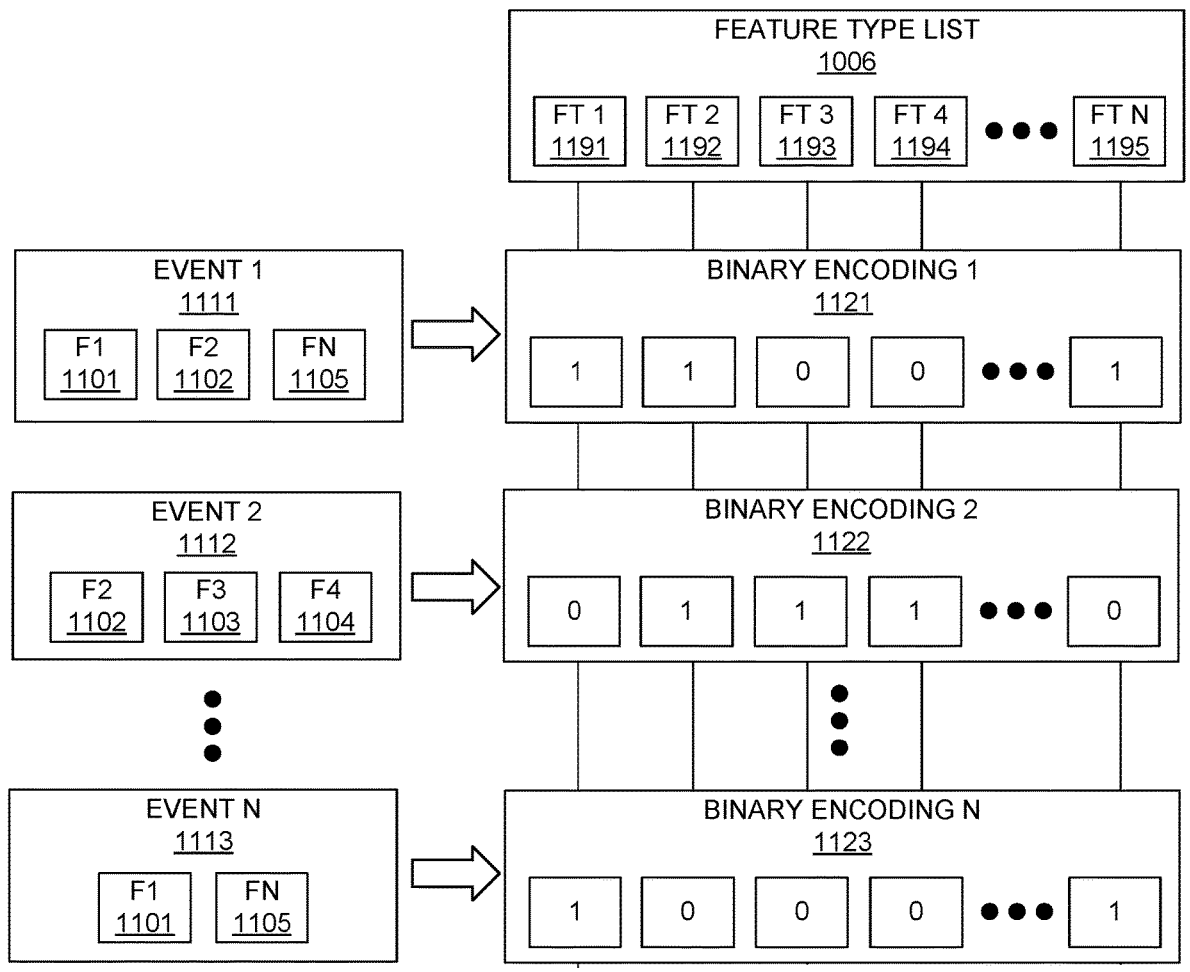
FIG. 11 illustrates an example binary encoding process in accordance with disclosed embodiments.

FIG. 11 shows example binary encodings in accordance with one or more embodiments. Specifically, FIG. 11 shows a feature type list 1006 corresponding to the like named component of FIG. 10. The feature type list 1006 includes multiple feature types (i.e., FT 1 1191, FT 2 1192, FT 3 1193, FT 4 1194, FTN 1195). FIG. 11 also shows multiple events (i.e., event 1 1111, event 2 1112, event N 1113) including multiple features. For example, event 1 1111 includes features F1 1101, F2 1102, and FN 1105. As another example, event 2 1112 includes features F2 1102, F3 1103, and F4 1104. As yet another example, event N 1113 includes features F1 1101 and FN 1105. Assume F1 1101, F2 1102, F3 1103, F4 1104, and FN 1105 are features belong to feature types FT 1 1191, FT 2 1192, FT 3 1193, FT 4 1194, and FTN 1195, respectively.

Binary encoding 1 1121 corresponds to event 1 1111. Each entry in binary encoding 1 1121 correspond to a feature type in the feature type list 1006. The entries corresponding to FT 1 1191, FT 2 1192, and FT N 1195 are set to "1" because event 1 1111 includes features belonging to FT 1 1191, FT 2 1192, and FT N 1195. The remaining entries in binary encoding 1 1121 are set to "0" because event 1 1111 is missing features belonging to FT 3 1193 and FT 4 1194.

Binary encoding 2 1122 corresponds to event 2 1112. Each entry in binary encoding 2 1122 correspond to a feature type in the feature type list 1006. The entries corresponding to FT 2 1192, FT 3 1193, and FT 4 1194 are set to "1" because event 2 1112 includes features belonging to FT 2 1192, FT 3 1193, and FT 4 1194. The remaining entries in binary encoding 2 1122 are set to "0" because event 2 1112 is missing features belonging to FT 1 1191 and FTN 1195.

Binary encoding N 1123 corresponds to event N 1113. Each entry in binary encoding N 1123 correspond to a feature type in the feature type list 1006. The entries corresponding to FT 1 1191 and FT N 1195 are set to "1" because event N 1113 includes features belonging to FT 1 1191 and FT N 1195. The remaining entries in binary encoding N 1123 are set to 0 because event 3 1113 is missing features belonging to FT 2 1192, FT 3 1193, and FT 4 1194.

Figure 12:
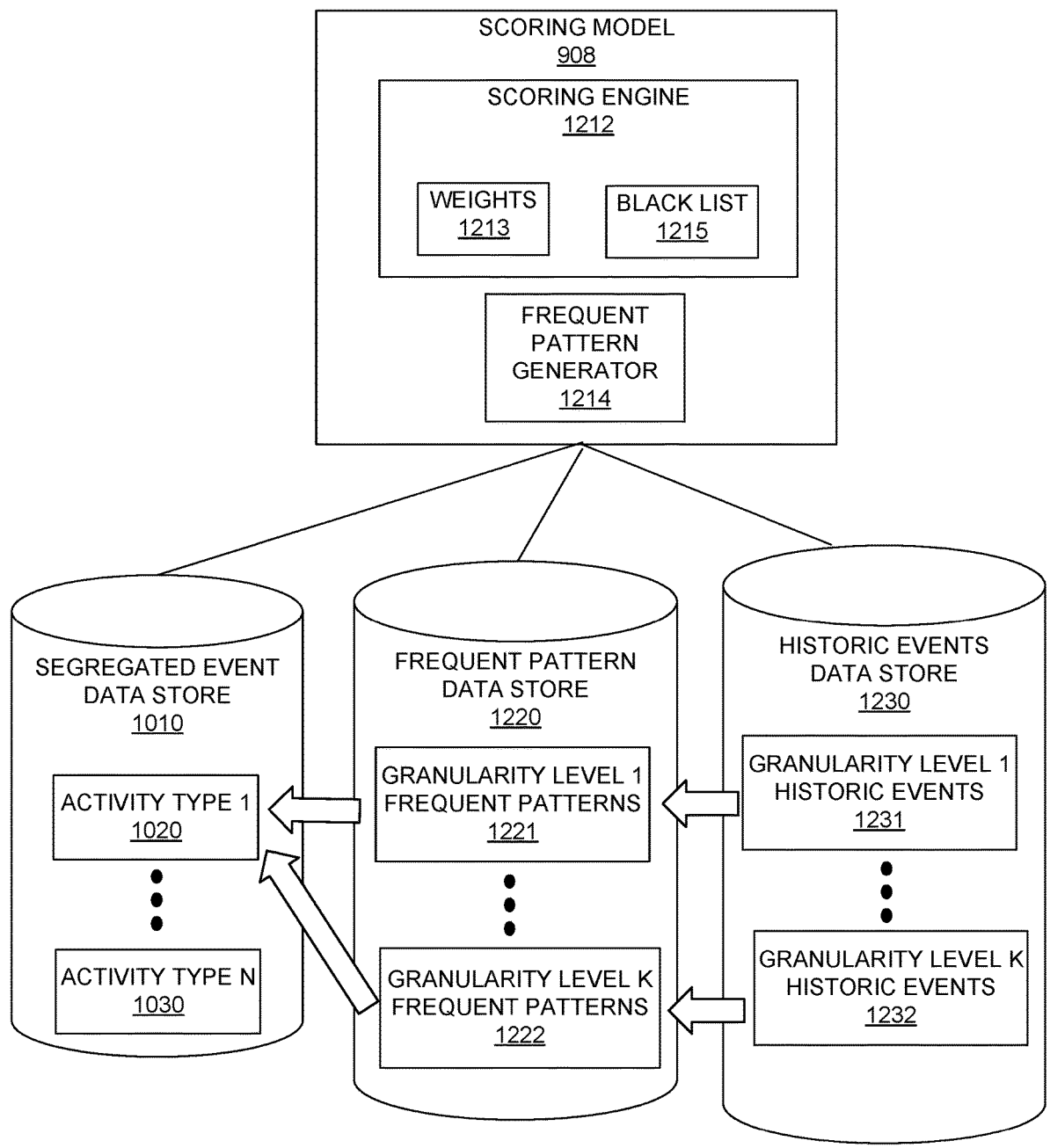
FIG. 12 illustrates a block diagram of a scoring model and data stores in accordance with disclosed embodiments.

FIG. 12 shows a diagram of scoring model 908, segregated event data store 1010, frequent pattern data store 1220, and historic events data store 1230. In one or more embodiments, two or more of the segregated event data store 1010, the frequent pattern data store 1220, and the historic events data store 1230 are part of the same physical storage device. Scoring model 908 and segregated event data store 1010 correspond to the like named components of FIG. 9 and FIG. 10. The frequent pattern data store 1220 of FIG. 12 includes functionality to store multiple frequent patterns. Each of the frequent patterns includes one or more features and each of the frequent patterns may be obtained by executing one or more frequent itemset mining algorithms on historic events (discussed below). As shown in FIG. 12, the frequent patterns are organized by granularity levels (i.e., granularity level 1 frequent patterns 1221 granularity level K frequent patterns 1222). Each granularity level includes one or more frequent patterns. Some frequent patterns may belong to multiple granularity levels. In one or more embodiments, each frequent pattern includes one or more features of different feature types. Moreover, there may be feature overlap between patterns. For example, one frequent pattern may consist of the feature {a}, while another frequent pattern may consist of the features {a, b}, while yet another frequent pattern may consist of the features {a, b, c}. The length of the frequent pattern is the number of features in the pattern. For example, the length of the frequent pattern {a, b, c} is three, while the length of frequent pattern {a} is one.

In one or more embodiments, each activity type is associated with a set of frequent patterns spread across multiple granularity levels. For example, activity type 1 1020 may be associated with granularity level 1 frequent patterns 1221 through granularity level K frequent patterns 1222. As another example, activity type N 1030 may be associated with a different set of frequent patterns (not shown) spread across multiple levels and also stored in frequent pattern data store 1220. Additional details regarding granularity levels are discussed below.

In one or more embodiments, the scoring model 908 includes scoring engine 1212. The scoring engine 1212 includes functionality to calculate multiple scores for each event. Specifically, each score for an event may be calculated based on pattern matching between the features in the event and the frequent patterns belonging to a granularity level. For example, assume there is an event belonging to activity type 1 1020. One score for the event may be calculated based on pattern matching between the features in the event and the frequent patterns in granularity level 1 frequent patterns 1221. Another score for the event may be calculated based on pattern matching between the features in the event and the frequent patterns in granularity level K frequent patterns 1222. Additional details regarding calculating/determining scores are discussed below and in reference to FIG. 15. Each score may be referred to as a level specific score as each score is associated with frequent patterns in a single granularity level.

In one or more embodiments, the scoring engine 1212 also includes a black list 1215 and optionally one or more weights 1213. The black list 1215 stores features known to be threats. For example, features on the black list 1215 may correspond to known security threats (e.g., malicious users, malicious IP addresses, malicious devices, malicious applications, etc.). The weights 1213 may correspond to the features on the black list 1215. If the event includes a feature on the black list 1215, one or more scores for the event may further be based on the weight assigned to the feature on the black list 1215.

In one or more embodiments, the scoring engine 121 is further configured to calculate an aggregate score for each event. The aggregate score is based on the multiple scores (i.e., the level-specific scores) for the event. For example, the aggregate score for an event may be the sum of the multiple scores for the event. As another example, the aggregate score may be the product of the multiple scores for the event. As yet another example, the aggregate score may be the average or median of the multiple scores (i.e., the level-specific scores). The aggregate score for an event may be normalized to a value that is between 0 and 1. In one or more embodiments, the lower the aggregate score, the less likely the event is an anomaly. In contrast, the higher the aggregate score, the more likely the event is an anomaly. An event that is not classified as an anomaly may be referred to as "normal" or a "normal event." An event is "normal" when the event occurs with a certain degree of frequency (e.g., above a threshold number of times) and regularity over periods of time, such that it can be said that the event is part of the every day, legitimate activity of a computing environment. In this respect, and event that occurs with a high degree of frequency over a short period of time, or occurs infrequently but regularly, may not be normal events, and may be anomalies.

The historic events data store 1230 includes functionality to store multiple historic events that were deemed to be normal. In other words, the historic events data store 1230 may exclude historic events that were deemed to be anomalies. Within a single activity type, there may be multiple granularity levels. The granularity level defines the degree of matching events for the purposes of anomaly detection. In broad terms, an anomaly is an outlier in comparison to other events in a grouping. The granularity level defines which other events are in the grouping. The multiple granularity levels form a hierarchy within the activity type. For example, the broadest granularity level (e.g., the granularity level at the top of the hierarchy) may be a global level that includes all historic events within the single activity type. Other granularity levels may be more narrow (e.g., the other granularity levels are lower in the hierarchy). For example, some granularity levels may be user specific and only include historic events associated with a single user. As another example, some granularity levels may be device or application specific and, thus, only include historic events associated with a single device or single application. If the historic events are associated with commerce, some granularity levels may be merchant specific and thus only include historic events associated with the single merchant. An historical event may belong to more than one granularity level. In one or more embodiments, granularity level 1 historic events 1231 and granularity level K historic events 1232 are all historic events of activity type 1 1020. The historic events data store 1230 may also store historic events (not shown) belonging to activity type N 1030.

In one or more embodiments, the scoring model 908 includes the frequent pattern generator 1214. The frequent pattern generator 1214 includes functionality to generate frequent patterns based on historic events. Specifically, the frequent pattern generator 1214 may execute one or more frequent itemset mining algorithms to identify frequent patterns of features. Specifically, the frequent pattern generator 1214 generates granularity level 1 frequent patterns

1221 by executing one or more frequent itemset mining algorithms on granularity level 1 historic events 1231. Similarly, the frequent pattern generator 1214 generates granularity level K frequent patterns 1222 by executing one or more frequent itemset mining algorithms on granularity level K historic events 1232. Example frequent itemset mining algorithms include Apriori, Frequent Pattern (FP) Growth, Equivalence Class Transformation, Tree Projection, Co-Occurrence Frequent Itemset, etc. The outputs of a frequent itemset mining algorithm are frequent patterns of various lengths.

Figure 13:
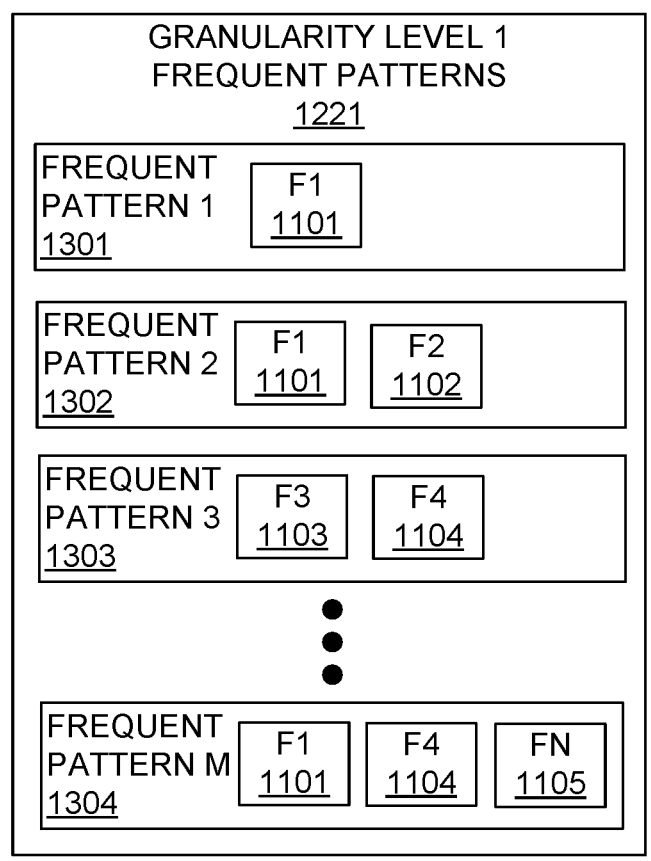
FIG. 13 illustrates a block diagram of a set of frequency patterns belonging to a single granularity level in accordance with the disclosed embodiments.

FIG. 13 shows an example of granularity level 1 frequent patterns 1221. Frequent pattern 1 1301, frequent pattern 2 1302, frequent pattern 3 1303, and frequent pattern M 1304 were identified by executing a frequent itemset mining algorithm on granularity level 1 historic events 1231. As shown in FIG. 13, some features (e.g., F1 1101) belong to multiple frequent patterns. Moreover, different frequent patterns may be of different lengths. For example, frequent pattern M 1304 has a length of 3, while frequent pattern 2 1302 and frequent pattern 3 1303 each have a length of 2, and frequent pattern 1 1301 has a length of 1.

Referring back to FIG. 12, those skilled in the art, having the benefit of this detailed description, will appreciate that minimum support (minSupport) is a parameter used by frequent itemset mining algorithms to identify frequent patterns of features. The minimum support parameter controls the frequency with which a pattern must appear before the pattern can be considered a frequent pattern. A low minSupport value results in many frequent patterns, while a large minSupport value results in few frequent patterns. In one or more embodiments, the frequent pattern generator includes functionality to calculate the minSupport value based on the desired number of frequent patterns and the number of historic events. Additional details regarding the calculation of the minSupport value are discussed below in reference to FIG. 19.

Figure 14:
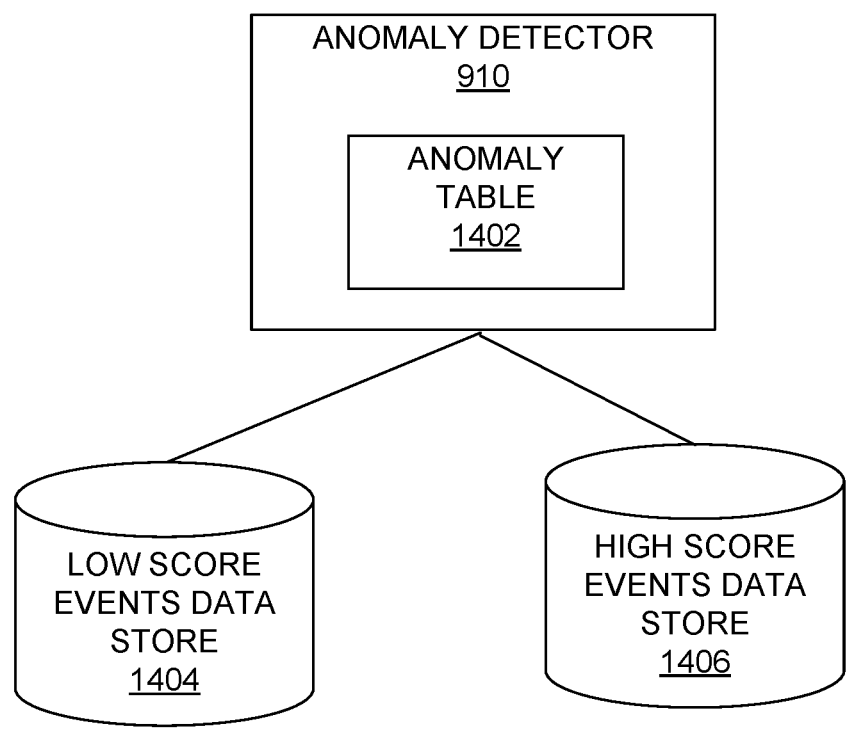
FIG. 14 illustrates a block diagram of an anomaly detector and data stores in accordance with the disclosed embodiments.

FIG. 14 shows a diagram of anomaly detector 910, low score events data store 1404, and high score events data store 1406. Anomaly detector 910 corresponds to the like named component of FIG. 9. In one or more embodiments, the anomaly detector 910 of FIG. 14 includes functionality to determine whether an event is an anomaly or normal. Specifically, the anomaly detector 910 may compare the aggregate score of the event with an anomaly score threshold to determine whether the event is an anomaly.

In one or more embodiments, the low score events data store 1404 includes functionality to store events that have been deemed normal (i.e., not anomalies). The anomaly detector 910 may periodically transfer the low score events data store 1404 into the historic events data store 1230, discussed above in reference to FIG. 12, for use in generating frequent patterns. In contrast, the high score events data store 1406 includes functionality to store events that have been deemed anomalies. In one or more embodiments, one or more frequent itemset mining algorithms may be executed on the events in the high score events data store 1406 (i.e., executed on the anomalous events). The output from executing these algorithms is one or more anomaly frequent patterns (e.g., new frequent patterns) that may be included in custom reports of the anomaly detector 910.

In one or more embodiments, the anomaly detector 910 includes an anomaly table 1402. The anomaly table 1402 may track or record events that have been deemed anomalies. The anomaly table 1402 may also store a count as to how many times anomalous events with identical features have occurred within a time window (e.g., within the last 24 hours, within the last 48 hours, within the last week, within the last month, within the last six months, since the system has been operational, etc.). For example, assume the time window is one week and anomalous events E1={a, b, c}, E2={a, b, c}, and E3={a, b, c} have all been processed within the last week. In this example, the count for anomalous events with identical features {a, b, c} would be 3. In one or more embodiments, when the count for anomalous events with identical features exceeds a maximum count, these identical features may be deemed to have appeared too frequently to be considered anomalies. The anomaly detector 910 may include functionality to reduce the aggregate scores for these events below the anomaly score threshold and then store these events in the low score events data store 1404.

In one or more embodiments, the anomaly table 1402 may also store counts as to the number of users, devices, and/or applications that have seen anomalous events with identical features within a time window. When one of these counts exceeds a count threshold, an event with these identical features may be deemed to be less suspicious. The anomaly detector 910 may reduce the aggregate score of the event by a default amount (e.g., 10%, 17%, etc.). Following the reduction, if the aggregate score is still in excess of the anomaly score threshold, the event is still deemed an anomaly and stored in the high score events data score 1406. Otherwise, the event may now be deemed normal and stored in the low score events data store 1404.

In one or more embodiments, the anomaly detector 910 includes functionality to issue alerts identifying the events in the high score events data store 1406 as anomalies. The anomaly detector 910 may also include functionality to issue custom reports including statistics about any of the data tracked in the anomaly table 1402.

FIGS. 15-19 show flowcharts in accordance with disclosed embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 15:
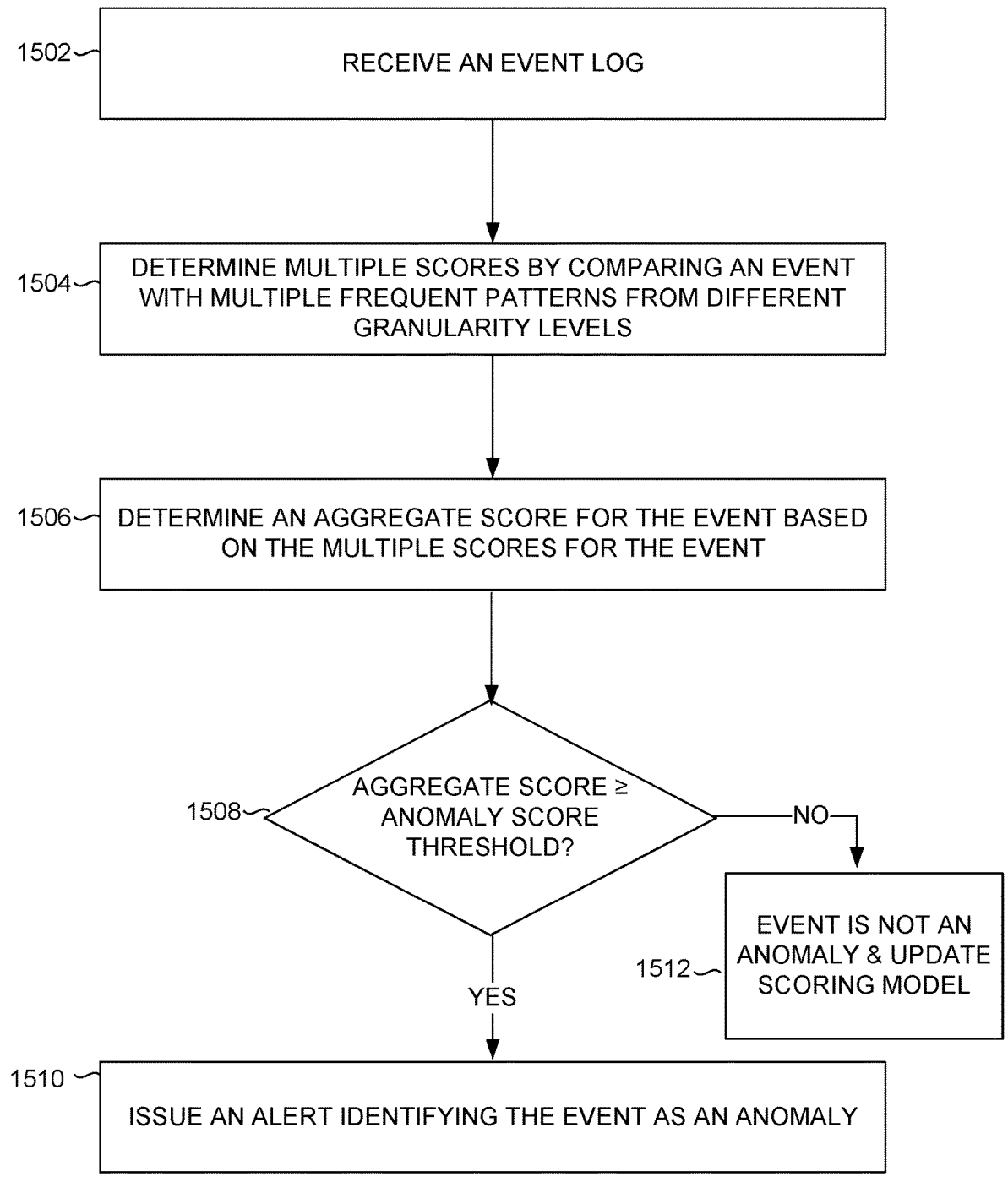
FIG. 15 is a flow diagram that illustrates how to identify events that are anomalies in accordance with disclosed embodiments.

FIG. 15 is a flow diagram that illustrates operation of the analyzer 904 in accordance with disclosed embodiments. The process depicted in FIG. 15 may, in part, be used to identify events that are anomalies.

In Block 1502, an event log with multiple events is received. Each event includes a portion of machine-generated data and is associated with a timestamp. Moreover, each event is a recordation of an action performed by or at one or more devices. The events may include, for example, network traffic events including packets through one or more firewalls, packets routed by one or more routers, etc. Further, each event includes one or more features.

The multiple events of the event log may belong to the same or different activity types. For example, activity types may include logins, authentications, resource accessing, etc.

Events grouped or clustered to the same activity type have similar feature types. In contrast, events from belonging to different activity types may have different feature types. In one or more embodiments, binary encoding is used to cluster or group the events by activity type.

In Block 1504, multiple scores are determined (e.g., calculated) for an event by comparing the event with multiple frequent patterns from different granularity levels. As discussed above, for each activity type, there may be multiple frequent patterns spread across multiple granularity levels. Each of the multiple scores for an event may be determined (e.g., calculated) based on pattern matching between the features in the event and the frequent patterns belonging to one of the granularity levels. For example, assume the event belongs to activity type A, and there are P granularity levels (described above with reference to FIG. 12) associated with activity type A. Accordingly, P scores will be determined (e.g., calculated) for the event (i.e., one score for each of the P granularity levels). The number/type of granularity levels and thus the frequent patterns may be different for different activity types. Each of the scores determined (e.g., calculated) in Block 1504 may be referred to as a level-specific score. Additional details regarding score determination (e.g., calculation) is discussed below in reference to FIG. 16.

In Block 1506, an aggregate score is determined (e.g., calculated) for the event. The aggregate score for the event is determined (e.g., calculated) based on the multiple level-specific scores for the event. In one or more embodiments, the larger the aggregate score, the more likely the event is an anomaly. The aggregate score for the event may be determined (e.g., calculated), for example, by summing or averaging the multiple level-specific scores for the event. Additionally or alternatively, the aggregate score for the event may be determined (e.g., calculated) by multiplying the multiple level-specific scores for the event. Additionally or alternatively, the aggregate score for the event may be the maximum of the level-specific scores. Additionally or alternatively, the aggregate score for the event may be the maximum of a subset of the level-specific scores averaged with another level-specific score. The aggregate score may be optionally normalized between a value of 0 and 1.

In Block 1508, the aggregate score for the event is compared with an anomaly score threshold. When it is determined that the aggregate score satisfies (e.g., equals or exceeds) the anomaly score threshold, the process proceeds to Block 1510. When it is determined that the aggregate score does not satisfy (e.g., is less than) the anomaly score threshold, the process proceeds to Block 1512. Different activity types may utilize different anomaly score thresholds. One or more of the anomaly score thresholds may be user specified.

In Block 1510, the event has been deemed an anomaly and an alert is issued identifying the event as an anomaly. The alert may be displayed, stored, and/or transmitted (e.g., emailed) to a user. The alert may be included on a report. The alert may be reported to another application that takes action based on the alert. The alert may be specific to this event. Additionally or alternatively, there may be a single alert covering multiple anomalous events.

In Block 1512, the event has been deemed normal (i.e., not an anomaly). In one or more embodiments, the event may be used to update a scoring model. Specifically, the event may be added to the historic events data store 1230 and used to generate or update frequent patterns in the future.

Blocks 1504, 1506, and 1508 may be repeated for each event in the event log. As discussed above, the event log may include events from one or more incoming data streams (e.g., data streams from different network devices). Moreover, as also disclosed above, these events may belong to different activity types. The number/type of granularity levels and thus the frequent patterns in Block 1504 may differ depending on the activity type to which the event belongs. Further, the algorithm for determining (e.g., calculating) the aggregate score in Block 1506 may differ depending on the activity type to which the event belongs. Further still, the anomaly score threshold in Block 1508 may also differ depending on the activity type to which the event belongs.

Figure 16:
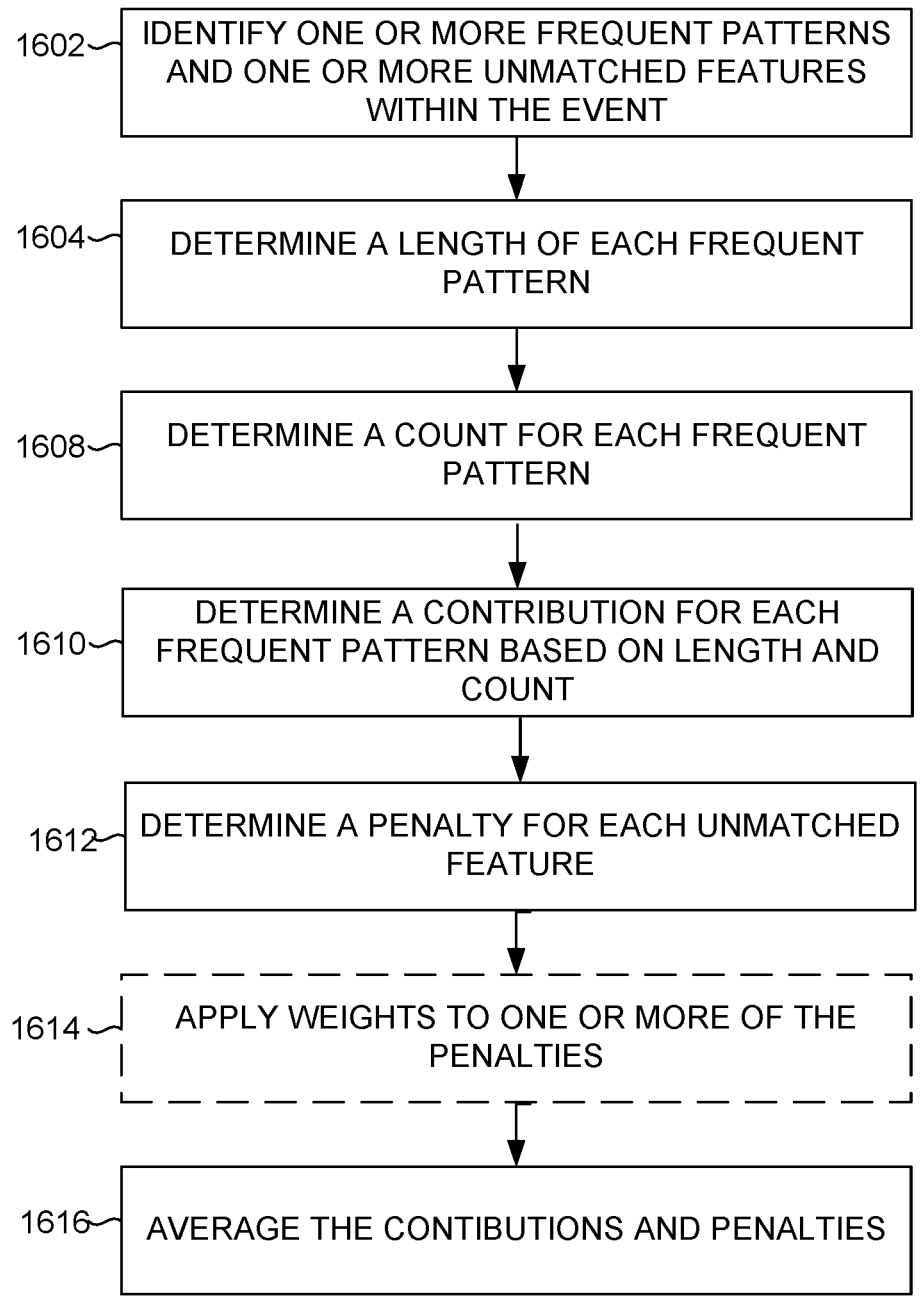
FIG. 16 is a flow diagram that illustrates how to calculate a level-specific score for an event in accordance with disclosed embodiments.

FIG. 16 is a flow diagram that illustrates operation of the scoring model 908 in accordance with disclosed embodiments. The process depicted in FIG. 16 may be used, in part, to determine (e.g., calculate) a level-specific score for an event. One or more of the Blocks in FIG. 16 may correspond to Block 1504 in FIG. 15. Prior to starting the process depicted in FIG. 16, an event E has been selected from an event log and the activity type to which event E belongs is also known.

In Block 1602, one or more frequent patterns and one or more unmatched features within the event are identified. In one or more embodiments, identifying the frequent patterns includes comparing the event with frequent patterns belonging to a single granularity level. Any remaining features in the event that do not match one of the frequent patterns are unmatched features.

For example, assume event E={a, b, c, d, e}, where a, b, c, d, and e are features. For example, event E={Network, KerberosProcess, isDeviceWithADDomain, msspinfoapp, 168.136.162.24}. Further, assume frequent patterns FP1={x, y, z}, FP2={a}, FP3={a, b}, and FP4={a, b, c} are all frequent patterns in a single granularity level for the activity type to which event E belongs. Accordingly, in this example, the frequent patterns FP2, FP3, and FP4 are identified in the event. However, the features {d} and {e} in the event E do not match any of the frequent patterns and thus are unmatched features.

In Block 1604, the length of each identified frequent pattern is determined. The length of an identified frequent pattern is the number of features in the frequent pattern. Returning to the example from Block 1602, the length of FP2 is 1, the length of FP3 is 2, and the length of FP4 is 3. Len(FPi) means the length of identified frequent pattern i (e.g., Len(FP3)=2).

In Block 1608, a count for each of the identified frequent patterns is identified. The count is the number of times the identified frequent pattern appears in events belonging to the same activity type. Returning to the example from Block 1602 and 1604, the count for FP2 is the number of times FP2 appears in the events belonging to the same activity type as event E. Similarly, the count for FP3 is the number of times FP3 appears in the events belonging to the same activity type as event E. Similarly, the count for FP4 is the number of times FP4 appears in the events belonging to the same activity type as event E. Count(FPi) means the count of identified frequent pattern i.

In Block 1610, a contribution is determined (e.g., calculated) for each of the identified frequent patterns. In one or more embodiments, the contribution for identified FPi=k/[$\gamma$Len(FPi)*$\beta$Support(FPi)], where Support(FPi)=Count(FPi)/(total number of events belonging to the same activity type as event E), and where k, $\gamma$, and $\beta$ are constants. In one or more embodiments k=$\gamma$=$\beta$=1.

In Block 1612, a penalty is determined (e.g., calculated) for each identified unmatched feature. In one or more embodiments, the penalty for an unmatched feature is the total number of events (i.e., cardinality of events) in the activity type to which the event E belongs. Additionally or alternatively, the penalty for an unmatched feature may be a constant (e.g., 0.75, 2.7, 50, etc.). In other words, the penalty may be the same for each unmatched feature and unrelated to the total number of events.

In Block 1614, weights may be applied to one or more of the penalties. As discussed above, the scoring engine 1212 may maintain a black list 1215 identifying suspicious features. As also discussed above, the scoring engine 1212 may maintain weights 1213 for features on the back list 1215. In one or more embodiments, if an unmatched feature is on the black list 1215, the penalty for the unmatched feature, as determined (e.g., calculated) in Block 1612, is scaled (e.g., increased) by the corresponding weight for the unmatched feature stored in weights 1213. In one or more embodiments, Block 1614 is only executed if the scoring engine 1212 maintains a black list 1215 of features and weights 1213.

In Block 1616, an average of the contributions and penalties is determined (e.g., calculated). If weights were applied in Block 1614, the determined (e.g., calculated) average is effectively a weighted average. In one or more embodiments, the determined (e.g., calculated) average of Block 1614 is a level-specific score for event E.

In one or more embodiments, Blocks 1602-1616 are repeated multiple times for a single event E. During different iterations, the single event E is compared with frequent patterns from different granularity levels (e.g., granularity level 1 frequent patterns 1221, granularity level K frequent patterns 1222, etc.). Accordingly, the average determined (e.g., calculated) during each iteration of Block 1616 may be a score (for event E) specific to one granularity level. If there are K granularity levels for the activity type to which event E belongs, Blocks 1602-1616 may be executed K times and K level-specific scores for event E may be determined (e.g, calculated).

Figure 17:
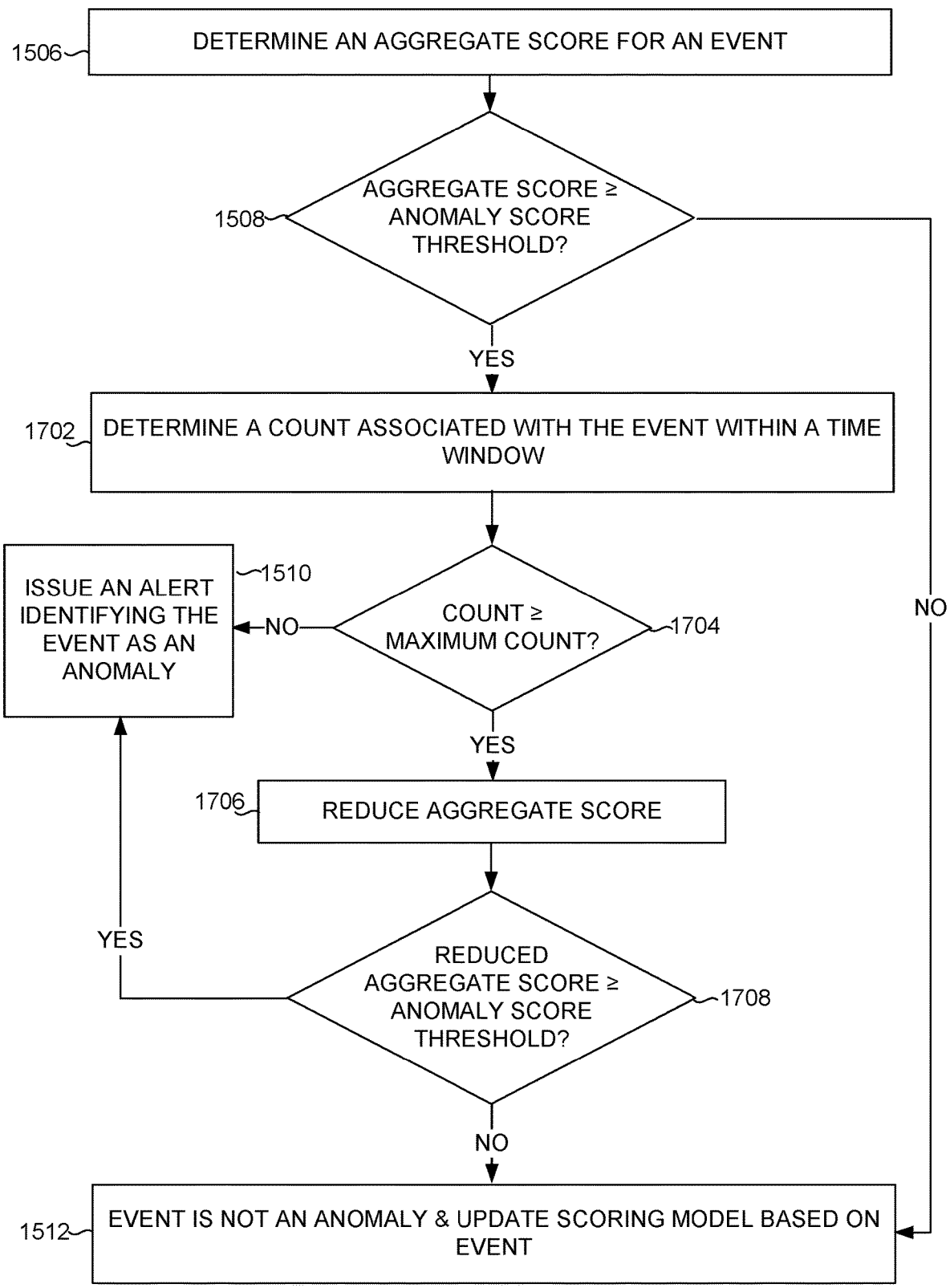
FIG. 17 is a flow diagram that illustrates how to process potentially anomalous events in in accordance with disclosed embodiments.

FIG. 17 is a flow diagram that illustrates operation of the anomaly detector 910 in accordance with disclosed embodiments. The process depicted in FIG. 17 may be used, in part, to process potentially anomalous events. Prior to staring the process depicted in FIG. 17 a maximum count (e.g., 10, 15, 19, etc.) for an event and a time window of any duration (e.g., 2 hours, 3 days, 1 week, 1 month, etc.) has been specified (e.g., by a user, by an application, etc.). Both the maximum count and the time window may be stored within the anomaly table 1402.

In Block 1506, an aggregate score is determined (e.g., calculated) for an event. The aggregate score for the event is determined (e.g., calculated) based on the multiple level-specific scores for the event. In one or more embodiments, the larger the aggregate score, the more likely the event is an anomaly. Additional details regarding Block 1506 are discussed above in reference to FIG. 15.

In Block 1508, the aggregate score for the event is compared with an anomaly score threshold. When it is determined that the aggregate score satisfies (e.g., equals or exceeds) the anomaly score threshold, the process proceeds to Block 1702. When it is determined that the aggregate score does not satisfy (e.g., is less than) the anomaly score threshold, the process proceeds to Block 1512. Additional details regarding Block 1508 and Block 1512 are discussed above in reference to FIG. 15.

In Block 1702, a count is determined. In one or more embodiments, the count is the number of times anomalous events with identical features to the anomalous event from Block 1508 have been processed during a specific time window. Determining the count may include searching one or more data stores (e.g., high score events data store 1406) looking for anomalous events with identical feature to the anomalous event from Block 1508. Additionally or alternatively, determining the count may include accessing a table (e.g., anomaly table 1402) that tracks/records the processed anomalous events.

In Block 1704, the count is compared with a maximum count. When it is determined that the count satisfies (e.g., equals or exceeds) the maximum count, the process proceeds to Block 1702. When it is determined that the count does not satisfy (e.g., is less than) the maximum count, the process proceeds to Block 1510. Additional details regarding Block 1510 are discussed above in reference to FIG. 15.

Those skilled in the art, having the benefit of this detailed description, will appreciate that over time, when anomalous events with identical features have been recorded/observed many times (e.g., equaling or exceeding the maximum count), it might no longer be proper to classify these events as anomalies. Accordingly, in Block 1706, the aggregate score of the event is reduced (e.g., by 10%, 21%, or any other specified amount). The absolute or percentage amount for the reduction may be specified by a user prior to execution of the proceed depicted in FIG. 17.

In Block 1708, the reduced aggregate score for the event is compared with the anomaly score threshold. When it is determined that the reduced aggregate score still satisfies (e.g., equals or exceeds) the anomaly score threshold, the process proceeds to Block 1510. When it is determined that the reduced aggregate score no longer satisfies the anomaly score threshold, the process proceeds to Block 1512. In other words, the event is no longer deemed to be an anomaly. Instead, the event is deemed to be normal. In Block 1512, the now-normal event is used to update the scoring model. Additional details regarding Block 1512 are discussed above in reference to FIG. 15.

The process depicted in FIG. 17 focuses heavily on tracking a single count (i.e., the number of times anomalous events with identical features have been processed) during a time window. In one or more embodiments, additional counts are also tracked. For example, the number of users that have observed anomalous events with identical features during a time window may be tracked, the number of devices that observed anomalous events with identical features during a time window may be tracked, the number of applications that observed anomalous events with identical features during a time window may be tracked, etc. If one or more of these counts exceed their respective thresholds during the time window, then the aggregate score for the event from Block 1508 may be reduced (e.g., by 10%, 21%, or any other specified amount). Those skilled in the art, having the benefit of this detailed description, will appreciate that if anomalous events with identical features to the event from Block 1508 have been observed historically across many users, devices, applications, etc., the event from Block 1508 is less suspicious and less likely to be an anomaly. Reducing the aggregate score for the event might or might not bring the aggregate score below the aggregate score threshold, and thus might reclassify the event an normal.

Although the process depicted in FIG. 17 focuses heavily on reducing the aggregate score for an event, in additional or alternative embodiments, the aggregate score for an event may be increased (e.g., 105%, 138%, 200%, etc.). For example, if the event contains features that have appeared in many events among many different devices within a short time window (e.g., 24 hours), this may indicate the event is suspicious. If the aggregate score for the event is not already in excess of the aggregate score threshold, the increase may place the aggregate score in excess of the aggregate score threshold, and thus the event may be deemed an anomaly.

Figure 18:
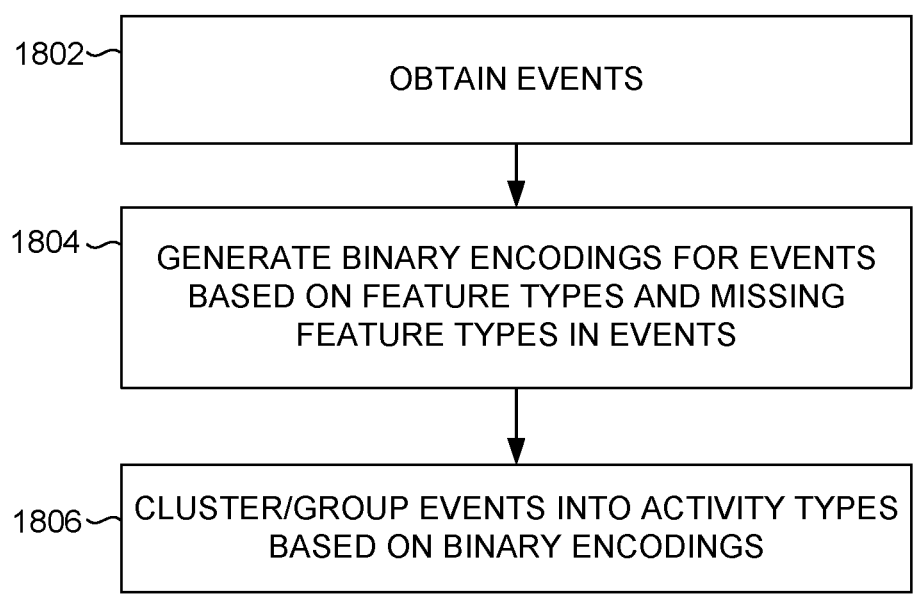
FIG. 18 is a flow diagram that illustrates how to cluster events by activity type using binary encoding in accordance with disclosed embodiments.

FIG. 18 is a flow diagram that illustrates operation of the classifier 906 in accordance with disclosed embodiments. The process depicted in FIG. 18 may be used, in part, to cluster events by activity type using binary encoding. One or more of the blocks in FIG. 18 may correspond to Block 1502, discussed above in reference to FIG. 15.

In Block 1802, multiple events are obtained. The events may be obtained via an event log. Each event includes a portion of machine-generated data and is associated with a specific point in time. Moreover, each event includes one or more features. Different events may belong to different activity types. However, the events might not be grouped by activity type within the event log.

In Block 1804, a binary encoding is generated for each event. A binary encoding many have multiple entries and each entry corresponds to a different feature type. If an entry in a binary encoding is populated with a "1", this means the corresponding event has a feature belonging to the feature type associated with the entry. If an entry in a binary encoding is populated with a "0", this means the corresponding event does not have a feature (i.e., is missing a feature) belonging to the feature type associated with the entry. Example binary encodings are shown in FIG. 11. Example feature types may include destination device, source device, port number, protocol used, application name, application type, etc.

In Block 1806, the events are grouped/clustered by activity types. For example, activity types may include logins, authentications, resource accessing, etc. Those skilled in the art, having the benefit of this detailed description, will appreciate that events grouped or clustered to the same activity type have similar feature types. In contrast, different events belonging to different activity types have different feature types. In one or more embodiments, the events are group by executing a clustering algorithm. However, the clustering algorithm is not executed on the events themselves, but rather on the binary encodings. Once it is determined which binary encodings belong to which activity types, the clustering of the corresponding events is known. Example clustering algorithms include k-means clustering, mean-shift clustering, density-based spatial clustering of applications with noise (DBSCAN), and power iteration clustering on the Jaccard distance.

Those skilled in the art, having the benefit of this detailed description, will appreciate that the process depicted in FIG. 18 enables one or more disclosed components or processes to handle events of different activity types. In one or more embodiments, the process depicted in FIG. 18 is executed on the incoming events (i.e., the events in the event log) because none of the events include a feature that directly identifies the activity type to which the event belongs. In other words, none of the events include a feature or feature type that is unique to one activity type. In contrast, if an event includes a feature that is unique to one activity type, the event may be excluded from the process depicted in FIG. 18 because the activity type to which the event belongs is known. For example, if an event includes an authentication request as a feature and the authentication request is unique to the authentication activity type, the event belongs to the authentication activity type and there is no need for the process depicted in FIG. 18 to be executed on the event.

Figure 19:
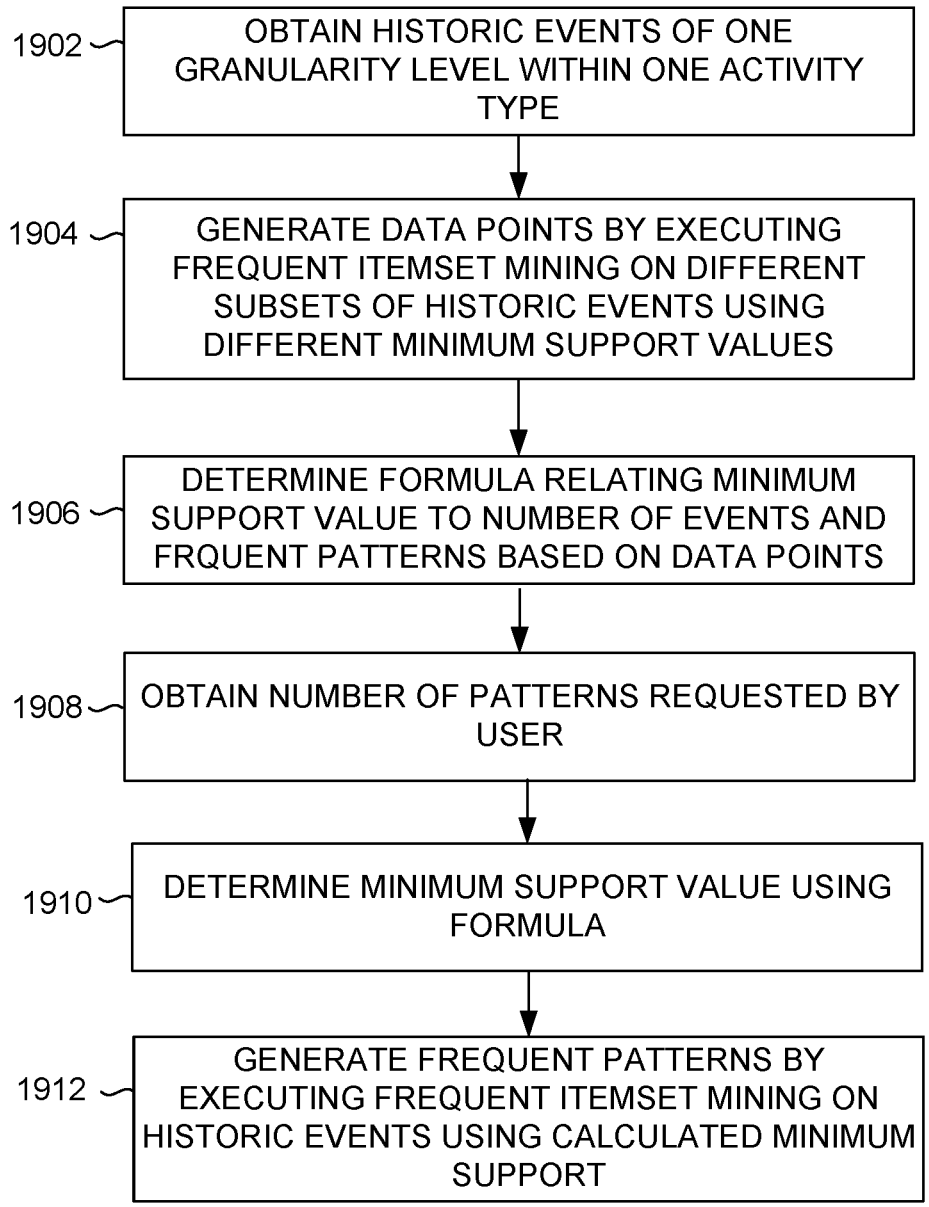
FIG. 19 is a flow diagram that illustrates how to calculate a minimum support value for use in a frequent itemset mining algorithm in accordance with disclosed embodiments.

FIG. 19 is a flow diagram that illustrates operation of the frequent pattern generator 1214 in accordance with disclosed embodiments. The process depicted in FIG. 19 may be used, in part, to determined (e.g., calculate) a minimum support value for use in a frequent itemset mining algorithm and generate frequent patterns. One or more of the blocks in FIG. 19 may be executed before Block 1504, discussed above in reference to FIG. 15.

In Block 1902, historic events of one granularity level within one activity type are obtained. These historic events may be obtained from historic events data store 1230, discussed above in reference to FIG. 12. The number of historic events may be in the hundreds, thousands, tens of thousands, hundreds of thousands, millions, etc. Each of the historical events includes one or more features.

In Block 1904, multiple data points are generated by executing frequent itemset mining on M different subsets of the historic events using N different minimum support values. The different subsets may have different sizes (i.e., different cardinalities). As discussed above, minimum support is a parameter used by frequent itemset mining algorithms to identify frequent patterns of features. This parameter controls how often a pattern must appear before it can be considered a frequent pattern. A low minimum support value results in many frequent patterns, while a large minimum support value results in few frequent patterns.

Still referring to Block 1904, as an example, six subsets of historic events may be selected (M=6) and these six subsets are of different sizes: 50, 100, 250, 1000, 5000, and 100000 historic events. Moreover, five minimum support values may be selected (N=5): 0.001, 0.01, 0.1, 0.2, and 0.5. The six subsets and five minimum support values allow for 30 different scenarios/combinations (i.e., M×N=6×5=30).

For each scenario, the selected subset of historic events and the selected minimum support value are inputs to a frequent itemset mining algorithm (e.g., Apriori algorithm, FP Growth algorithm, etc.). The outputs of the frequent itemset mining algorithm are one or more frequent patterns. Accordingly, for each of the M×N scenarios, there exists a triplet data point: (number of historical events in subset, number of frequent patterns, minimum support value). Each triplet data point may be rewritten as: (number of historical events in subset, ratio, minimum support value), where ratio=number of frequent patterns/number of historical events in subset. Following the execution of Block 1904, there are M×N (e.g., 30) triplet data points each corresponding to one of the scenarios.

In Block 1906, a formula is determined for determining (e.g., calculating) the minimum support value based on a ratio and a number of events. In other words, the ratio and the number of events are inputs to the formula, while the minimum support value is the output of the formula. In one or more embodiments, it is assumed that the relationship between the ratio and both the number of events (#events) and the minimum support value (minSupport) is an exponential decaying function in the form:

$$\text{ratio}=\exp(-a1*\#\text{events}+b1)*\exp(-a2*\text{minSupport}+b2).$$

This may be rewritten as:

$$\log(\text{ratio})=-a1*\#\text{events}-a2*\text{minSupport}+(b1+b2)$$

Estimators of a1, a2, b1+b2 may be determined using the M×N triplet data points and mean squared error (MSE) loss. The formula may then be arranged as:

$$\text{minSupport}=\text{const1}*\#\text{events}+\text{const2}*\log(\text{ratio})+\text{const3}$$

In other words, the formula determines (e.g., calculates) the minimum support value based on two inputs: number of events (#events) and a ratio of the desired number of frequent patterns to the number of events. Additionally, an upper boundary (i.e., upperBound) and a lower boundary (i.e., lowerBound) may be set for minSupport. This results in:

minSupport=Min(Max(calculated minSupport,lowerBound),upperBound)

In Block 1908, the desired number of frequent patterns for the granularity level and activity type mentioned in Block 1902 is obtained. The desired number of frequent patterns may be a setting specified by a user or provided by an application at any time prior to execution of Block 1910.

In Block 1910, a minimum support value is determined (e.g., calculated) using the formula of Block 1906, the number of historic events obtained in Block 1902, and the desired number of frequent patterns obtained in Block 1908. If not directly provided, the ratio of the desired number of frequent patterns and the number of historic events is determined (e.g., calculated) for use in the formula.

In Block 1912, the frequent patterns for the granularity level and activity type mention in Block 1902 are generated. The frequent patterns are generated by submitting the historic events of Block 1902 and the minimum support value determined (e.g., calculated) in Block 1910 to a frequent itemset mining algorithm (e.g., Apriori algorithm, FP Growth algorithm, etc.). The frequent patterns generated in Block 1912 may correspond, for example, to granularity level 1 frequent patterns or granularity level K frequent patterns 1222, discussed above in reference to FIG. 12. In other words, the frequent patterns generated in Block 1912 may be stored in the frequent pattern data store 1220 and used to generate a level-specific score for an event in the segregated event data store 1010.

The process depicted in FIG. 19 may be repeated for each granularity level of each activity type. Following the multiple executions of the process depicted in FIG. 19, the frequent pattern data store 1220 may include frequent patterns for every granularity level of an activity type. Moreover, these frequent patterns may be used to generate level-specific scores for each of the events in the segregated event data store 1010.

Those skilled in the art, having the benefit of this detailed description, will appreciate that the process depicted in FIG. 19 enables one or more disclosed components or processes to determine (e.g., calculate) the minimum support value that will generate the number of frequent patterns requested by a user or external application.

The following example is not meant to be limiting in any way. Initially, network events are received in real time. Thousands and thousands of network events are being received every second. Each of the events has multiple features of one or more feature types (e.g., IP addresses, users names, MAC addresses, passwords, resource requests, URLs, etc.). These network events may be received from multiple components on the network. These events are recorded in an event log.

Different events may belong to different activities types (e.g., logins, authentications, resource access requests). However, when the events are recorded in the event log, it is unknown as to which events belong to which activity types. In order to cluster the events by activity type, a binary encoding is generated for each event and then a power iteration clustering algorithm is executed on the binary encodings. As each binary encoding corresponds to one of the events, once the binary encodings are clustered by activity type, it is known which events belong to which activity type.

Within a single activity type (e.g., logins), there may be one or more events that are anomalies. In other words, the anomalous events are different from the rest of the events also belonging to the same activity type. In some cases, an anomalous event is benign. However, in other cases, an anomalous event may be a security treat (e.g., a hacker, denial-of-service attack, etc.). Accordingly, it is important to quickly and efficiently identify anomalous events among all the events belonging to an activity type.

The level-specific scores and aggregate scores assigned to events, as discussed above, are used to identify anomalous events. These scores are based on frequent patterns that are activity type specific. For example, a frequent pattern for the login activity type may include an IP address, an device identifier, and an application identifier. Moreover, the frequent patterns for an activity type may span multiple granularity levels. An event with a large aggregate score is likely to be an anomalous event and a security threat. Accordingly, the system may take action to mitigate the security threat (e.g., discard/ignore all future requests from the device/application/user associated with the anomalous event, terminate the session of a device/application/user associated with the anomalous event, transmit alerts to IT personnel or other applications identifying a device/application/user associated with the anomalous event, etc.)

When some threshold count (e.g., 1002) of events with identical features are deemed to be anomalous within a time window (e.g., 6 hours), this is an indication that events with these identical features are actually normal (i.e., not anomalous).

Accordingly, these previously-considered anomalous events may be used to update the frequent patterns used to determine (e.g., calculate) the level-specific and aggregates scores. This is effectively a feedback loop that improves the frequent patterns and reduces the likelihood of false positives (i.e., events deemed anomalous when the events are actually normal).

4.0 Hardware

The various components of the figures may be a computing system or implemented on a computing system. For example, the operations of the data stores, indexers, search heads, host device(s), client devices, data intake and query systems, data sources, external resources, and/or any other component shown and/or described above may be performed by a computing system. A computing system may include any combination of mobile, desktop, server, router, switch, embedded device, or other types of hardware. For example, the computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. The computer processor(s) may be an integrated circuit for processing instructions. For example, the computer processor(s) may be one or more cores or micro-cores of a processor. The computing system may also include one or more input devices, such as a touchscreen, keyboard, mouse, microphone, touchpad, electronic pen, or any other type of input device.

The computing system may be connected to or be a part of a network. For example, the network may include multiple nodes. Each node may correspond to a computing system, such as the computing system, or a group of nodes combined may correspond to the computing system. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system may be located at a remote location and connected to the other elements over a network.

The node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes in the network may be configured to provide services for a client device. For example, the nodes may be part of a cloud computing system. The nodes may include functionality to receive requests from the client device and transmit responses to the client device. The client device may be a computing system. Further, the client device may include and/or perform all or a portion of one or more embodiments of the disclosure.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

While the above figures show various configurations of components, other configurations may be used without departing from the scope of the disclosure. For example, various components may be combined to create a single component. As another example, the functionality performed by a single component may be performed by two or more components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    receiving, at a computing device, an event log comprising a plurality of events, wherein the plurality of events is derived from machine data;
    determining a first score by comparing a first event from the event log with a first plurality of frequent patterns of features, wherein determining the first score comprises:
        determining a length of a frequent pattern within the first event in the event log and a count of occurrences of the frequent pattern within the plurality of events, wherein the frequent pattern is in the first plurality of frequent patterns,
        determining a contribution of the frequent pattern based on the length and the count,
        determining a penalty for an unmatched feature of the first event based on a cardinality of the plurality of events, and
        averaging the contribution and the penalty to obtain the first score; and
    issuing an alert identifying the first event as an anomaly using the first score and an anomaly score threshold.

2. The method of claim 1, wherein the first event includes a set of features, each feature of the set of features determined from one or more data items of the first event.

3. The method of claim 1, further comprising:
    applying a weight to the penalty in response to the unmatched feature existing on a black list,
    wherein averaging the contribution and the penalty comprises calculating a weighted average based on the contribution, the penalty, and the weight.

4. The method of claim 1, further comprising:
    determining an aggregate score for a second event based on comparing the second event with the first plurality of frequent patterns and a second plurality of frequent patterns;
    comparing the aggregate score for the second event with the anomaly score threshold; and
    updating, in response to the aggregate score for the second event being less than the anomaly score threshold, the first plurality of frequent patterns based on the second event.

5. The method of claim 1, further comprising:
    determining an aggregate score for the first event using the first score;
    determining, in response to the aggregate score for the first event exceeding the anomaly score threshold, a count of anomalous events having a same set of features as the first event during a time window; and
    comparing the count of anomalous events with a maximum count, wherein issuing the alert identifying the first event is further based on the count of anomalous events being less than the maximum count.

6. The method of claim 1, further comprising:
    determining a second score for a second event based on comparing the second event with the first plurality of frequent patterns;
    determining, in response to the second score exceeding the anomaly score threshold, a count of anomalous events having a same set of features as the second event during a time window;
    comparing the count of anomalous events with a maximum count;
    reducing the second score for the second event below the anomaly score threshold in response to the count of anomalous events exceeding the maximum count; and
    updating, in response to reducing the second score for the second event, at least the first plurality of frequent patterns based on the second event.

7. The method of claim 1, further comprising:
    determining a second score for a second event based on comparing the second event with the first plurality of frequent patterns;
    determining, in response to the second score for the second event exceeding the anomaly score threshold, a count of anomalous events having a same set of features as the second event during a time window;
    comparing the count of anomalous events with a maximum count; and
    reporting the second event in response to the count of anomalous events exceeding the maximum count.

8. The method of claim 1, further comprising:
determining a second score for a second event based on comparing the second event with the first plurality of frequent patterns, wherein the second score exceeds the anomaly score threshold; and
generating a new frequent pattern by executing frequent itemset mining on at least the first event and the second event.

9. The method of claim 1, further comprising:
identifying a first feature associated with the first event and a second feature associated with the first event, wherein the first feature is present in the first event and the second feature is not present in the first event;
generating a first binary encoding for the first event based on the first feature and the second feature;
generating a second binary encoding for a second event; and
determining the first event belongs to a first activity type and the second event belongs to a second activity type by executing a clustering algorithm on the first binary encoding and the second binary encoding.

10. The method of claim 1, further comprising:
obtaining a plurality of historic events;
generating data points by executing frequent itemset mining on different subsets of the plurality of historic events using different minimum support values, wherein the different subsets have different cardinalities;
determining, using the data points, a formula to calculate minimum support;
obtaining a ratio of a desired number of frequent patterns to a cardinality of the plurality of historic events;
determining, using the formula, a minimum support value based on the ratio and the cardinality of the plurality of historic events, wherein the ratio and the cardinality of the plurality of historic events are inputs to the formula; and
generating the first plurality of frequent patterns by executing the frequent itemset mining on the plurality of historic events using the minimum support value.

11. A system comprising:
memory comprising instructions; and
a computer processor for executing the instructions that cause the computer processor to perform operations comprising:
  receiving, at a computing device, an event log comprising a plurality of events, wherein the plurality of events is derived from machine data,
  determining a first score by comparing a first event from the event log with a first plurality of frequent patterns of features, wherein determining the first score comprises:
    determining a length of a frequent pattern within the first event in the event log and a count of occurrences of the frequent pattern within the plurality of events, wherein the frequent pattern is in the first plurality of frequent patterns,
    determining a contribution of the frequent pattern based on the length and the count,
    determining a penalty for an unmatched feature of the first event based on a cardinality of the plurality of events, and
    averaging the contribution and the penalty to obtain the first score, and
  issuing an alert identifying the first event as an anomaly using the first score and an anomaly score threshold.

12. The system of claim 11, wherein the first event includes a set of features, each feature of the set of features determined from one or more data items of the first event.

13. The system of claim 11, wherein the operations further comprises:
applying a weight to the penalty in response to the unmatched feature existing on a black list,
wherein averaging the contribution and the penalty comprises calculating a weighted average based on the contribution, the penalty, and the weight.

14. The system of claim 11, wherein the operations further comprises:
determining an aggregate score for a second event based on comparing the second event with the first plurality of frequent patterns and a second plurality of frequent patterns,
comparing the aggregate score for the second event with the anomaly score threshold, and
updating, in response to the aggregate score for the second event being less than the anomaly score threshold, the first plurality of frequent patterns based on the second event.

15. The system of claim 11, wherein the operations further comprises:
determining an aggregate score for the first event using the first score,
determining, in response to the aggregate score for the first event exceeding the anomaly score threshold, a count of anomalous events having a same set of features as the first event during a time window, and
comparing the count of anomalous events with a maximum count, wherein issuing the alert identifying the first event is further based on the count of anomalous events being less than the maximum count.

16. The system of claim 11, wherein the operations further comprises:
determining a second score for a second event based on comparing the second event with the first plurality of frequent patterns,
determining, in response to the second score exceeding the anomaly score threshold, a count of anomalous events having a same set of features as the second event during a time window,
comparing the count of anomalous events with a maximum count,
reducing the second score for the second event below the anomaly score threshold in response to the count of anomalous events exceeding the maximum count, and
updating, in response to reducing the second score for the second event, at least the first plurality of frequent patterns based on the second event.

17. The system of claim 11, wherein the operations further comprises:
determining a second score for a second event based on comparing the second event with the first plurality of frequent patterns,
determining, in response to the second score for the second event exceeding the anomaly score threshold, a count of anomalous events having a same set of features as the second event during a time window,
comparing the count of anomalous events with a maximum count, and
reporting the second event in response to the count of anomalous events exceeding the maximum count.

18. A non-transitory computer-readable storage medium storing computer-readable program code which, when executed by one or more processors, cause the one or more processors to perform operations comprising:
- receiving, at a computing device, an event log comprising a plurality of events, wherein the plurality of events is derived from machine data;
- determining a first score by comparing a first event from the event log with a first plurality of frequent patterns of features, wherein determining the first score comprises:
  - determining a length of a frequent pattern within the first event in the event log and a count of occurrences of the frequent pattern within the plurality of events, wherein the frequent pattern is in the first plurality of frequent patterns,
  - determining a contribution of the frequent pattern based on the length and the count,
  - determining a penalty for an unmatched feature of the first event based on a cardinality of the plurality of events, and
  - averaging the contribution and the penalty to obtain the first score; and
- issuing an alert identifying the first event as an anomaly using the first score and an anomaly score threshold.

19. The non-transitory computer-readable storage medium of claim 18, wherein the operations further comprises:
- applying a weight to the penalty in response to the unmatched feature existing on a black list,
- wherein averaging the contribution and the penalty comprises calculating a weighted average based on the contribution, the penalty, and the weight.

20. The non-transitory computer-readable storage medium of claim 18, wherein the operations further comprises:
- determining an aggregate score for a second event based on comparing the second event with the first plurality of frequent patterns and a second plurality of frequent patterns,
- comparing the aggregate score for the second event with the anomaly score threshold, and
- updating, in response to the aggregate score for the second event being less than the anomaly score threshold, the first plurality of frequent patterns based on the second event.

\* \* \* \* \*